United States Patent [19]
Linkner, Jr.

[11] Patent Number: 6,145,540
[45] Date of Patent: Nov. 14, 2000

[54] ROTARY SOLENOID VALVES FOR VEHICULAR APPLICATIONS

[75] Inventor: Herbert L. Linkner, Jr., Dexter, Mich.

[73] Assignee: Kelsey-Hayes Corp., Livonia, Mich.

[21] Appl. No.: 09/178,116

[22] Filed: Oct. 23, 1998

[51] Int. Cl.[7] .......................... F15B 13/044; F16K 31/08
[52] U.S. Cl. ................... 137/625.65; 137/625.22; 251/65; 251/129.07; 251/129.11; 251/283; 303/119.2
[58] Field of Search ................. 137/625.65, 625.22; 251/65, 129.11, 129.07, 283; 303/119.2

[56] References Cited

U.S. PATENT DOCUMENTS

| | | | |
|---|---|---|---|
| 2,822,821 | 2/1958 | Gordon | 251/283 X |
| 2,938,544 | 5/1960 | Simpson | 251/283 X |
| 3,007,494 | 11/1961 | Herzl | 137/625.65 |
| 3,023,779 | 3/1962 | Cinnirella | 137/635.65 |
| 3,175,585 | 3/1965 | Faisandier | 137/625.65 |
| 4,428,558 | 1/1984 | Odogaki et al. | 251/65 |
| 4,546,338 | 10/1985 | Idogaki et al. | 251/129.11 X |
| 4,561,629 | 12/1985 | Idogaki et al. | 251/65 |
| 4,735,233 | 4/1988 | Nogami et al. | 137/625.65 |
| 4,838,954 | 6/1989 | Perach | 137/625.65 |
| 5,014,748 | 5/1991 | Nogami et al. | 137/625.65 |
| 5,040,569 | 8/1991 | Nogami et al. | 137/625.65 |
| 5,388,614 | 2/1995 | Hakamada et al. | 137/625.65 |

FOREIGN PATENT DOCUMENTS

| 2104249 | 3/1983 | United Kingdom | 137/625.65 |
|---|---|---|---|

*Primary Examiner*—Gerald A. Michalsky
*Attorney, Agent, or Firm*—MacMillan, Sobanski & Todd, LLC; A. Michael Tucker

[57] ABSTRACT

A rotary solenoid valve for controlling pressurized fluid in a vehicular hydraulic system includes a housing having a bore. A valve body is mounted in the bore. The valve body includes an axial bore in fluid communication with a supply port, an output port, and a reservoir port. Each of the ports in the valve body is also in fluid communication with a corresponding fluid passage formed in the housing. A rotor is received in the axial bore of the valve body. The rotor includes at least one flat having a predetermined length so that the flat is in fluid communication with the ports in the valve body. An upper stator is mounted on the valve body about the rotor. A coil is mounted about the upper stator for generating a magnetic field to selectively rotate the rotor. Rotation of the rotor directs fluid through the valve between various ports as desired.

20 Claims, 18 Drawing Sheets

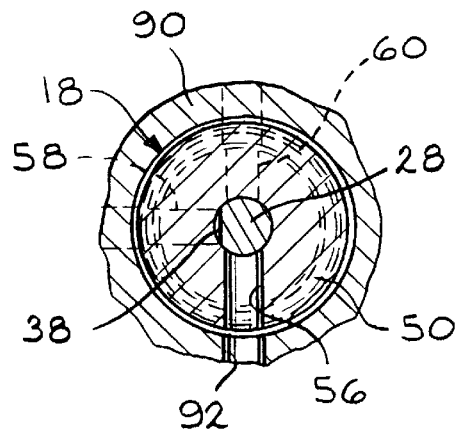
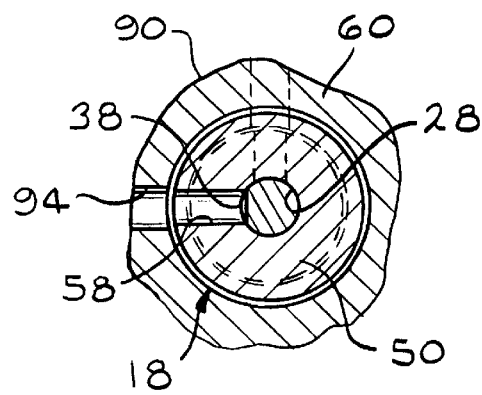
FIG. 6  FIG. 7
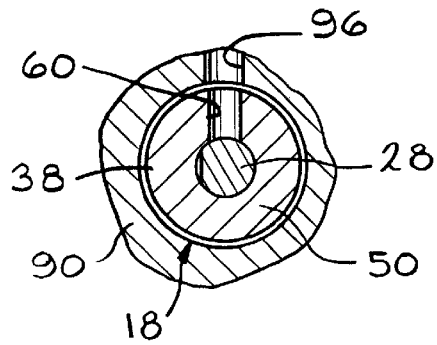
FIG. 8
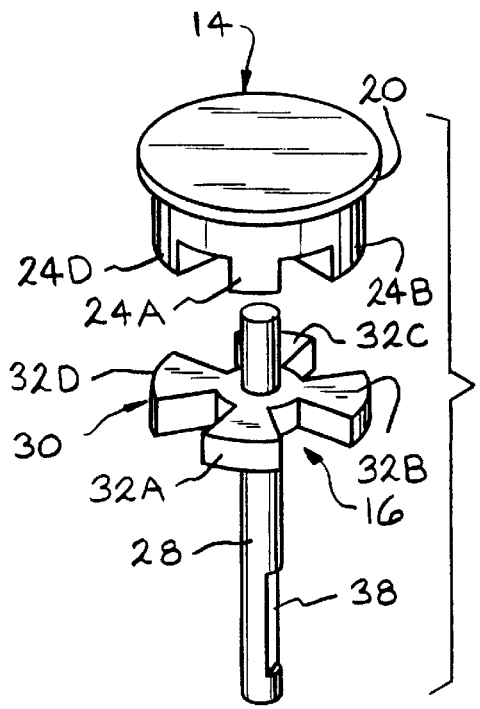
FIG. 9

ROTARY SOLENOID VALVES FOR
VEHICULAR APPLICATIONS

BACKGROUND OF THE INVENTION

This invention relates in general to rotary solenoid valves. Specifically, this invention is concerned with rotary solenoid valves particularly adapted for vehicular hydraulic systems such as brake and suspension systems.

Electronically controlled hydraulic brake systems for vehicles are well known. Such systems typically include a hydraulic control unit (HCU) connected between a master cylinder and wheel brakes. The master cylinder generates hydraulic forces in the brake circuit by pressurizing brake fluid when the driver steps on the brake pedal. The pressurized fluid travels through the fluid conduit in the circuit to actuate brake cylinders at the wheels and slow the vehicle.

The hydraulic control unit includes a housing mounting control valves and other components such as a pump. Through an electronic controller, the control valves and other components selectively control pressure to the wheel brakes to provide desired braking responses, such as anti-lock braking, traction control, and vehicle stability control.

Many of the control valves mounted in a HCU are formed as electronically controlled solenoid valves. A typical solenoid valve includes an armature that slides between two end positions in response to a magnetic flux generated by a coil subassembly of the solenoid valve. An armature can be formed as a cylindrical element slidably mounted in a tube or sleeve. Many electronically-controlled brake systems include both normally open solenoid valves (isolation valves) and normally closed solenoid valves (dump valves).

Electronically controlled hydraulic suspension systems include dampers shock absorbers and struts) and/or actuators. Such dampers and/or actuators typically include control valve that are opened and closed to permit fluid to selectively travel from a pressurized source of fluid. Many of the control valves used with dampers and actuators are electronically controlled solenoid valves.

It is desirable to manufacture economical control valves that provide desired responses in vehicular hydraulic systems. In many applications, it is desirable to provide control valves that are electronically controlled solenoid valves.

SUMMARY OF THE INVENTION

This invention includes a rotary solenoid valve adapted to control fluid in a vehicular hydraulic system. The rotary solenoid valve is economical to manufacture and provides desired results in applications such as vehicular brake systems and vehicular suspension systems. The rotary solenoid valve can be adapted for other automotive applications.

In a preferred embodiment, a rotary solenoid valve for controlling pressurized fluid in a vehicular hydraulic system includes a housing having a bore. A valve body is mounted in the bore. The valve body includes an axial bore in fluid communication with a supply port, an output port, and a reservoir port. Each of the ports in the valve body is also in fluid communication with a corresponding fluid passage formed in the housing. A rotor is received in the axial bore of the valve body. The rotor includes at least one flat having a predetermined length so that the flat is in fluid communication with the ports in the valve body. An upper stator is mounted on the valve body about the rotor. A coil is mounted about the upper stator for generating a magnetic field to selectively rotate the rotor. Rotation of the rotor directs fluid through the valve between various ports as desired.

Various objects and advantages of this invention will become apparent to those skilled in the art from the following detailed description of the preferred embodiment, when read in light of the accompanying drawings.

BRIEF DESCRIPTION OF THE DRAWINGS

FIG. 6 is a sectional view taken along line 6—6 of FIG. 2 illustrating a supply port in the valve body and a fluid passage in the hydraulic control unit.

FIG. 7 is a sectional view taken along line 7—7 of FIG. 2 illustrating an output port in the valve body and a fluid passage in the hydraulic control unit.

FIG. 8 is a sectional view taken along line 8—8 of FIG. 2 illustrating a reservoir port in the valve body and a fluid passage in the hydraulic control unit.

FIG. 9 is an exploded perspective view of the rotor and upper stator of the rotary solenoid valve illustrated in FIGS. 1–3 removed from the remainder of the valve for clarity of illustration.

DETAILED DESCRIPTION OF THE PREFERRED EMBODIMENTS

Figure 1:
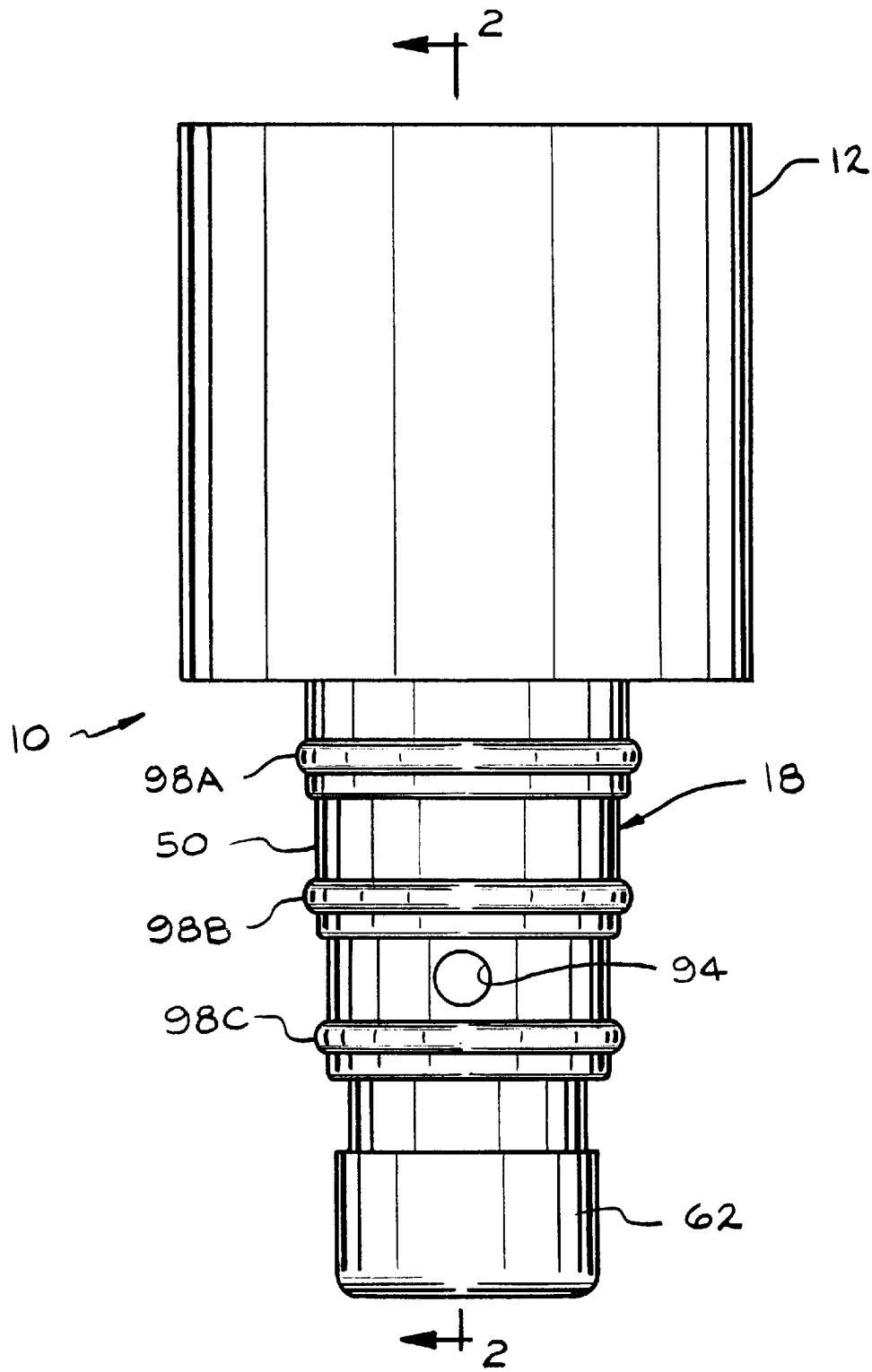
FIG. 1 is an elevation view of a first embodiment of a rotary solenoid valve according to this invention.
Figure 2:
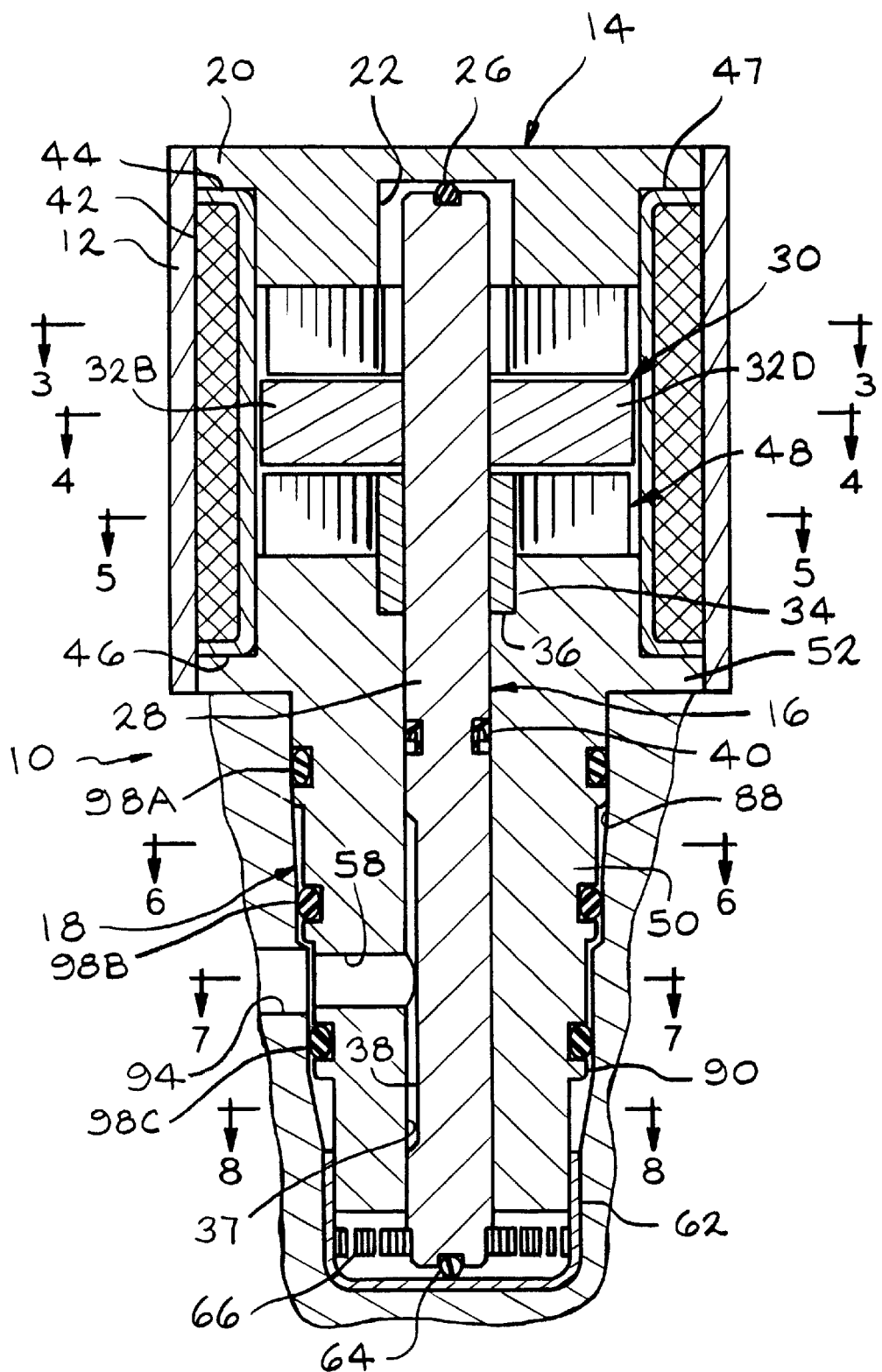
FIG. 2 is a sectional view taken along line 2—2 of FIG. 1 showing the valve mounted on a hydraulic control unit of a vehicular anti-lock braking system.

A rotary solenoid valve according to the present invention is indicated generally at 10 in FIGS. 1 and 2. The valve 10 is particularly suited to control fluid pressure in electronically controlled vehicular braking systems such as an anti-lock braking system (ABS) and electronically controlled vehicular suspension systems, as well as other automotive applications.

Figure 3:
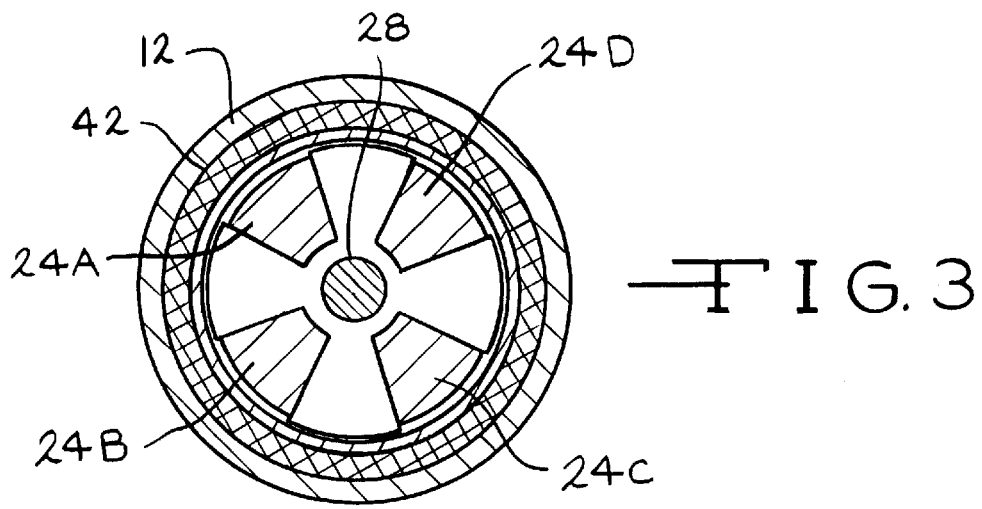
FIG. 3 is a sectional view taken along line 3—3 of FIG. 2 illustrating four legs of an upper stator.

The valve 10 includes a hollow cylindrical casing or housing 12 that receives an upper stator 14 and portions of a rotor 16 and a valve body (or lower stator) 18. The upper stator 14 includes an annular flange 20 having an outer diameter complementary to an inner diameter of the housing 12. An interior cavity 22 is formed in the upper stator 14 to receive an upper end of the rotor 14. A lower portion of the upper stator 14 is formed in a preferred four-legged pattern producing four legs 24A–24D illustrated best in FIGS. 3 and 9. Each of the legs 24A–24D extends radially inwardly toward the rotor 16. Preferably, the legs 24A–24D are equally spaced about the circumference of the upper stator 14. Preferably, a clearance is provided between a terminal end of each leg 24A–24D and the rotor 16. A thrust bearing 26, preferably formed as a ball bearing, is received in a cavity formed in an end of the rotor 16 and is in contact with the upper stator 14.

Figure 4:
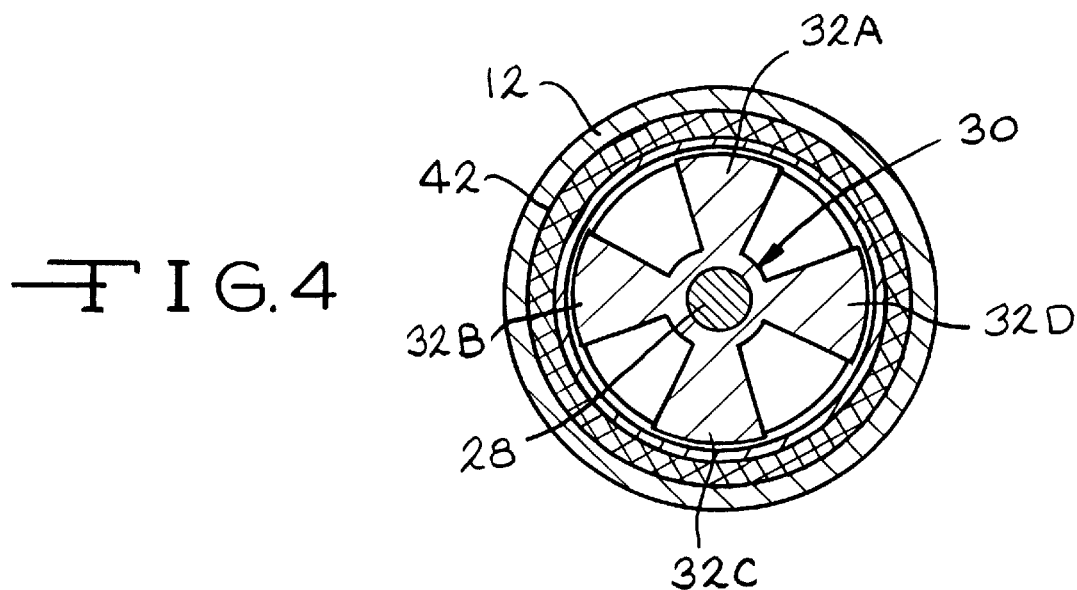
FIG. 4 is a sectional view taken along line 4—4 of FIG. 2 illustrating four legs of a wheel of a rotor.

The rotor 16 includes a shaft 28 and a wheel 30. The wheel 30 is formed from a ferromagnetic material and acts as an armature of the rotor 16. Preferably, the wheel 30 is formed in a four-legged pattern producing four legs 32A–32D illustrated best in FIGS. 4 and 9. Preferably, legs 32A–32D are equally spaced about the circumference of the wheel 30 and are aligned to be complementary to the open spaces between legs 24A–24D as seen by comparing FIGS. 3 and 4.

The shaft 28 is rotatably received in a sleeve bearing 34. The sleeve bearing 34 is mounted in a counterbore 36 formed in an upper surface of the valve body 18 while a lower portion of the shaft 28 extends through an axial bore 37 formed in the valve body 18. Preferably the sleeve bearing 34 is formed from a low friction material such as polytetrafluoroethylene. An axial flat 38 is formed in an outer surface of a lower portion of the shaft 28 to direct fluid flow through the valve 10 as described below. A seal 40, preferably a lip seal, is received in a groove formed in a mid-portion of the shaft 28.

A coil 42 is wound about a bobbin 44. The bobbin 44 is received in an annular cavity 46 formed in an upper surface of the valve body 18. Once the bobbin 44 and coil 42 are seated, the upper stator 14 is pressed onto the bobbin 44 so that an annular cavity 47 in the upper stator 14 also receives the bobbin 44. The housing 12 is pressed over the upper stator 14 and valve body 18 to secure the bobbin 44 and coil 42. If desired, the housing 12 can be secured to the upper stator 14 and/or valve body 18 by means such as welding. When energized, the coil 42 creates a magnetic flux that rotates the rotor 16 in a well-known manner.

The valve body 18 includes a lower stator portion 48 and a cylindrical portion 50. Preferably, the lower stator portion 48 and the cylindrical portion 50 are formed as a unitary element as illustrated. However, in other embodiments, the lower stator portion 48 and the cylindrical portion 50 can be formed as separate elements. An annular flange 52 is formed in the cylindrical portion 50 that seats the bobbin 44.

Figure 5:
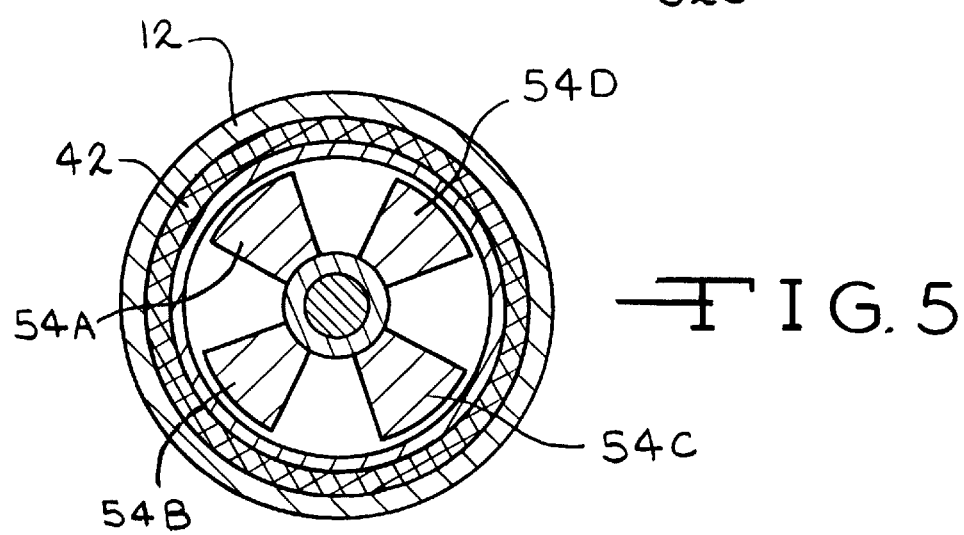
FIG. 5 is a sectional view taken along line 5—5 of FIG. 2 illustrating four legs of a lower stator portion of a valve body.

The lower stator portion 48 is formed in a preferred four-legged pattern producing legs 54A–54D illustrated best in FIG. 5. Preferably, legs 54A–54D are equally spaced about the circumference of the portion 48 and terminate at or near the sleeve bearing 34. Preferably, legs 54A–54D are substantially aligned with legs 24A–24D as seen by comparing FIGS. 3 and 5.

In FIG. 2, the valve body 18 is mounted in a stepped bore 88 of a housing 90 of a vehicular hydraulic system. The housing 90 also contains fluid passages that direct fluid from a source of pressurized fluid to a desired location after passing through various components such as valve 10 in the housing 90. The housing 90 can be formed as a hydraulic control unit (HCU) of a vehicular brake system, a damper of a vehicular suspension system, or another vehicular hydraulic system.

As seen in FIG. 6, a supply port 56 is formed in the cylindrical portion 50 of the valve body 18. The supply port 56 is connected to a source of pressurized brake fluid via a fluid passage 92 in the housing 90. As seen in FIGS. 2 and 7, an output port 58 is formed in the cylindrical portion 50 of the valve body 18. The output port 58 is connected to a wheel brake via a fluid passage 94 in the housing 90. As seen in FIG. 8, a reservoir port 60 is formed in the cylindrical portion 50 of the valve body 18. The reservoir port 60 is connected to a fluid reservoir via a fluid passage 96 in the housing 90. Seals 98A, 98B, and 98C are received in respective groove in the outer circumference of the cylindrical portion 50 to provide fluid seals between the ports 56, 58, and 60 and the housing 90.

The axial length of the flat 38 on the shaft 28 is selected so that the flat 38 faces each of the ports 56, 58, and 60.

Furthermore, the depth of the flat 38 is selected so that the rotation of the shaft 28 connects two of the selected ports. For example, when the housing 90 as viewed in FIGS. 6–8 forms a hydraulic control unit of a vehicular brake system, shaft 28 is rotated (for brake apply) so that fluid from supply port 56 can travel to output port 58 to permit pressurized fluid to reach a wheel brake. Shaft 28 is rotated (for brake dump) so that fluid from the output port 58 can travel to the reservoir port 60 to permit pressurized fluid to be dumped from a wheel brake. A hold mode at a wheel brake can be accomplished in the position illustrated in FIG. 7 wherein fluid from the output port 58 is blocked from reaching either the supply port 56 or the reservoir port 60.

An end cap 62 is provided at a lower end of the valve body 18 that covers a lower end of the shaft 28. A thrust bearing 64 is received in a cavity in a lower surface of the shaft 28 and is placed between the shaft 28 and the end cap 62. A spring 66, preferably a torsion spring, is connected to the shaft 28 and the end cap 62 and provides a resistance to the rotation of the rotor 16 in a well known manner.

Figure 10:
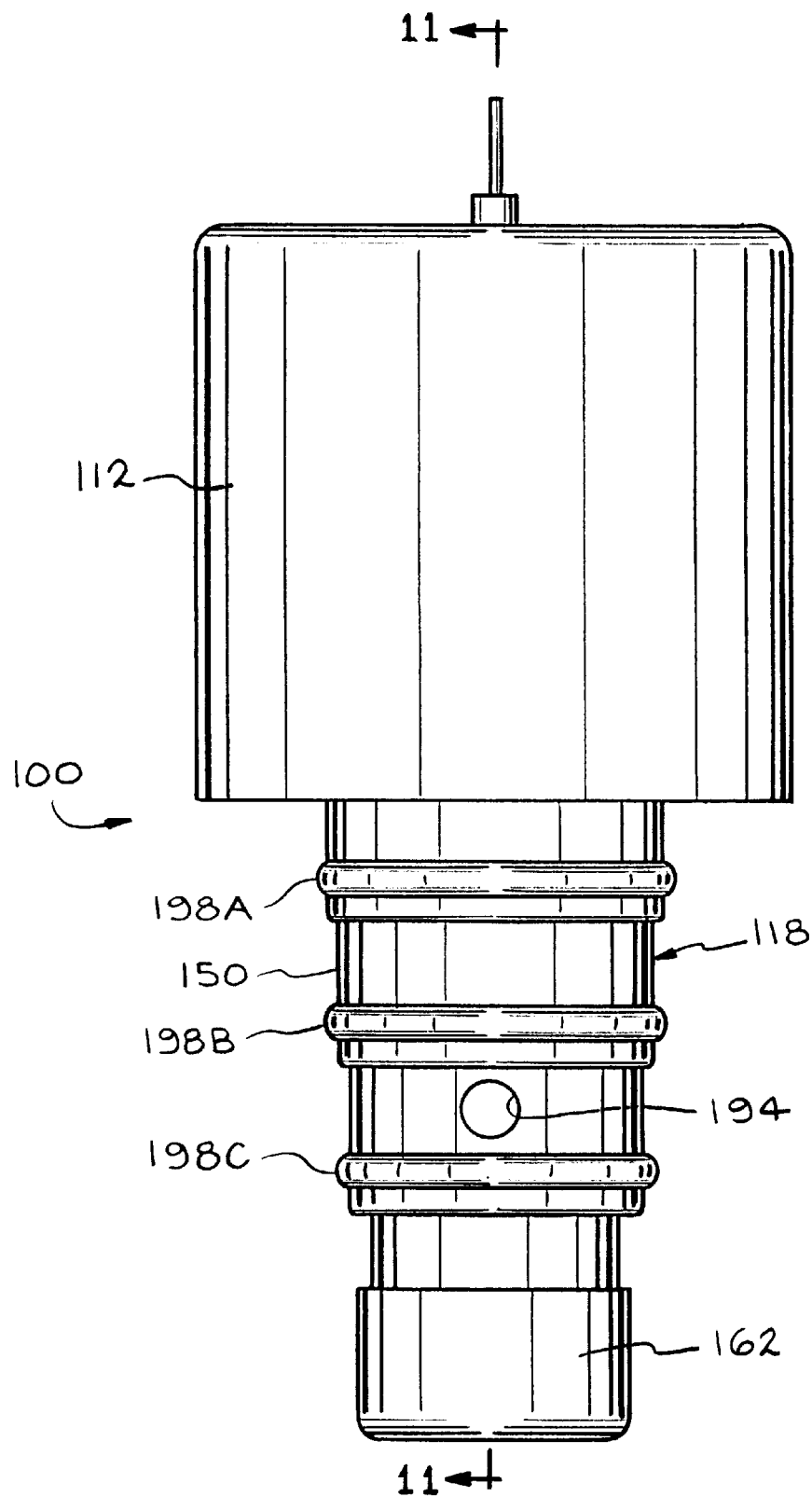
FIG. 10 is an elevational view of a second embodiment of a rotary solenoid valve according to this invention.
Figure 11:
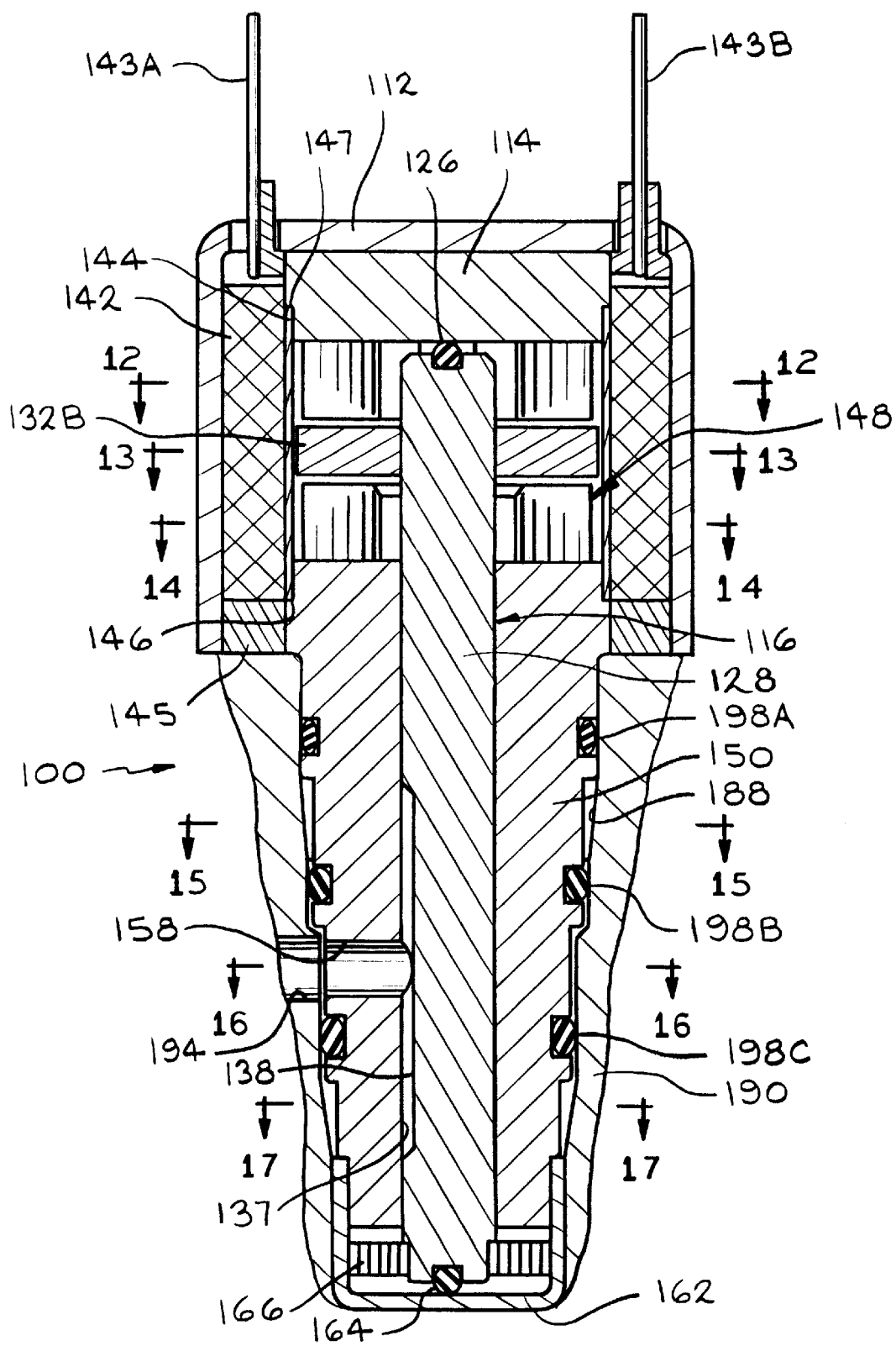
FIG. 11 is a enlarged sectional view taken along line 11—11 of FIG. 10 showing the valve mounted on a hydraulic control unit of a vehicular anti-lock braking system.

A second embodiment of a rotary solenoid valve according to the present invention is indicated generally at 100 in FIGS. 10 and 11. The valve 100 is particularly suited to control brake fluid pressure in electronically controlled vehicular brake systems. Such systems can include an anti-lock brake system (ABS) or an electronic brake management system (EBM). Such brake systems can also provide traction control and vehicle stability control functions. The valve 100 is also particularly suited to control fluid pressure in electronically controlled vehicular suspension systems, including semi-active and active.

Figure 12:
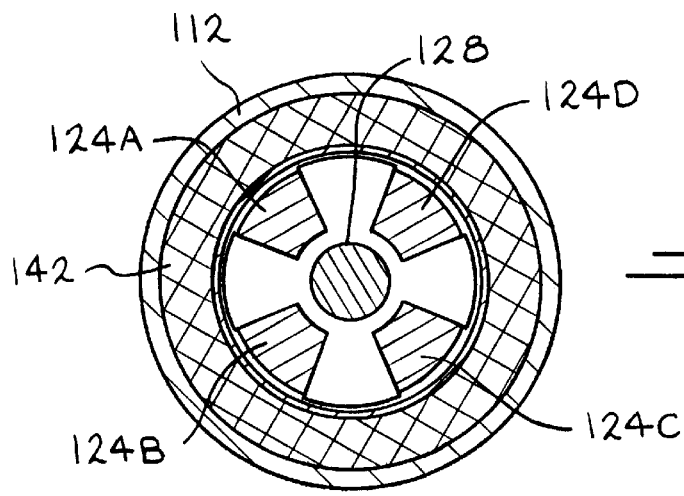
FIG. 12 is a sectional view taken along line 12—12 of FIG. 11 illustrating four legs of an upper stator.

The valve 100 includes a cup-shaped casing or housing 112 which receives an upper stator 114 and portions of a rotor 116 and a valve body 118. The upper stator 114 has an outer diameter complementary to an inner diameter of the casing 112. A lower surface of the upper stator 114 is formed in a preferred four-legged pattern producing four legs 124A–124D illustrated best in FIG. 12. Each of the legs 124A–124D extends radially inwardly toward the rotor 116. Preferably, the legs 124A–124D are equally spaced about the circumference of the upper stator 114. Preferably, a clearance is provided between a terminal end of each leg 124A–124D and the rotor 116. A thrust bearing 126, preferably formed as a ball bearing, is received in a cavity formed in an end of the rotor 116 and is in contact with the upper stator 114.

Figure 13:
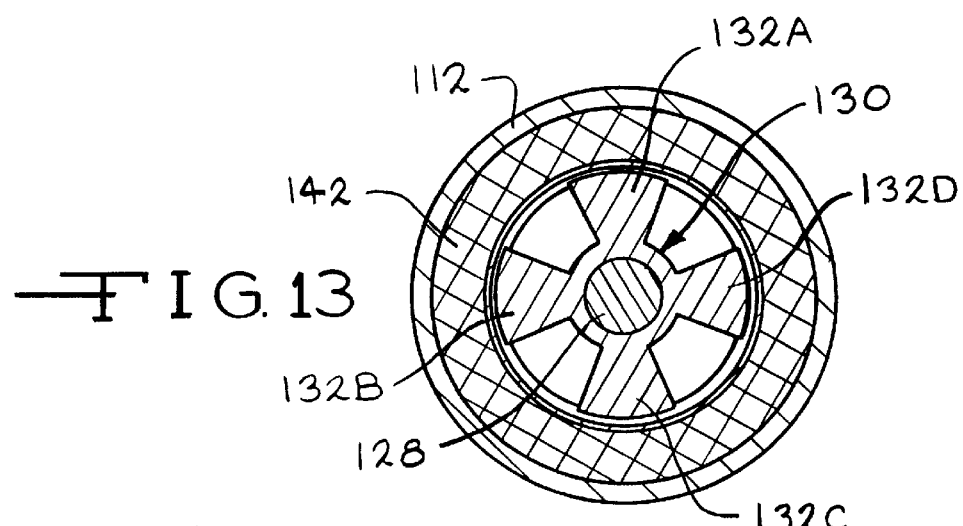
FIG. 13 is a sectional view taken along line 13—13 of FIG. 11 illustrating four legs of a wheel of a rotor.

The rotor 116 includes a shaft 128 and a wheel 130. Preferably, the wheel 130 is formed in a four-legged pattern producing four legs 132A–132D illustrated best in FIG. 4. Preferably, legs 132A–132D are equally spaced about the circumference of the wheel 130 and are aligned to be complementary to the open spaces between legs 124A–124D as seen by comparing FIGS. 12 and 13.

The shaft 128 is rotatably received in an axial bore 137 formed in the valve body 118. An axial flat 138 is formed in an outer surface of a lower portion of the shaft 128 to direct fluid flow through the valve 100 as described below.

A coil 142, preferably a bobbinless coil, is received in the casing 112. Terminal ends 143A and 143B of the coil 142 extend through respective openings in the casing 112. An annular flux ring 145 is pressed into an open end of the casing 112 to retain the coil 142.

A lower end of a pressure tube 144 is received in an annular step 146 formed in an upper surface of the valve body 118. An upper end of the tube 144 is received in an annular step 147 formed in a lower surface of the upper stator 114. The tube 144 secures the upper stator 114 to the valve body 118, thereby containing the rotor 116 between the upper stator 114 and the valve body 118. If desired, the tube 144 can be welded to the upper stator 114 and/or the valve body 118.

The housing 112 with the coil 142 and flux ring 145 is pressed onto the valve body 118. An interference fit is provided between the flux ring 145 and an annular flange 152 formed at the step 146 of the valve body 118. When energized, the coil 142 creates a magnetic flux that rotates the rotor 116 in a well-known manner. Preferably, the tube 144 is formed from a non-magnetic stainless steel and is not part of the magnetic coil. The tube 144 sets the magnetic gap and gain between the upper stator 114 and lower stator portion 148. Also, the tube 144 provides a hydraulic fluid seal, thereby eliminating the need for a seal about shaft 128.

The valve body 118 includes a lower stator portion 148 and a cylindrical portion 150. Preferably, the lower stator portion 148 and the cylindrical portion 150 are formed as a unitary element as illustrated. However, in other embodiments, the lower stator portion 148 and the cylindrical portion 150 can be formed as separate elements.

Figure 14:
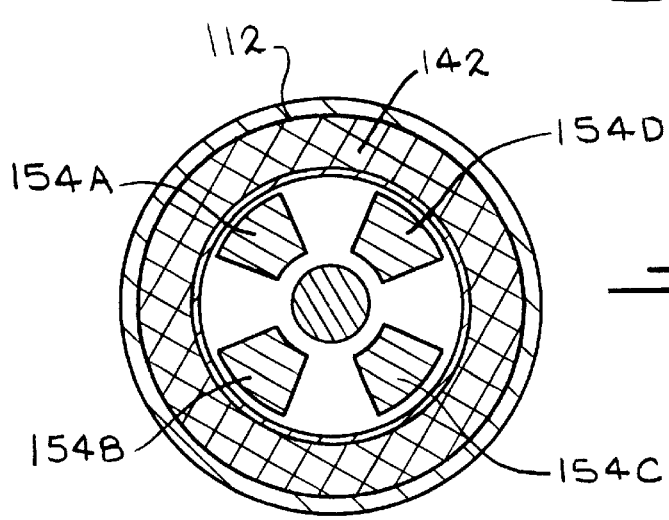
FIG. 14 is a sectional view taken along line 14—14 of FIG. 11 illustrating four legs of a lower stator of a valve body.

The lower stator portion 148 is formed in a preferred four-legged pattern producing legs 154A–154D illustrated best in FIG. 14. Preferably, legs 154A–154D are equally spaced about the circumference of the portion 148 and terminate at or near the shaft 128. Preferably, legs 154A–154D are substantially aligned with legs 124A–124D as seen by comparing FIGS. 12 and 14.

In FIG. 11, the valve body 118 is mounted in a stepped bore 188 of a hydraulic control unit (HCU) 190 of a vehicular braking system. The HCU 190 also contains fluid passages that direct fluid from a source of pressurized brake fluid to wheel brakes after passing through various components such as valve 100 in the HCU 190.

Figure 15:
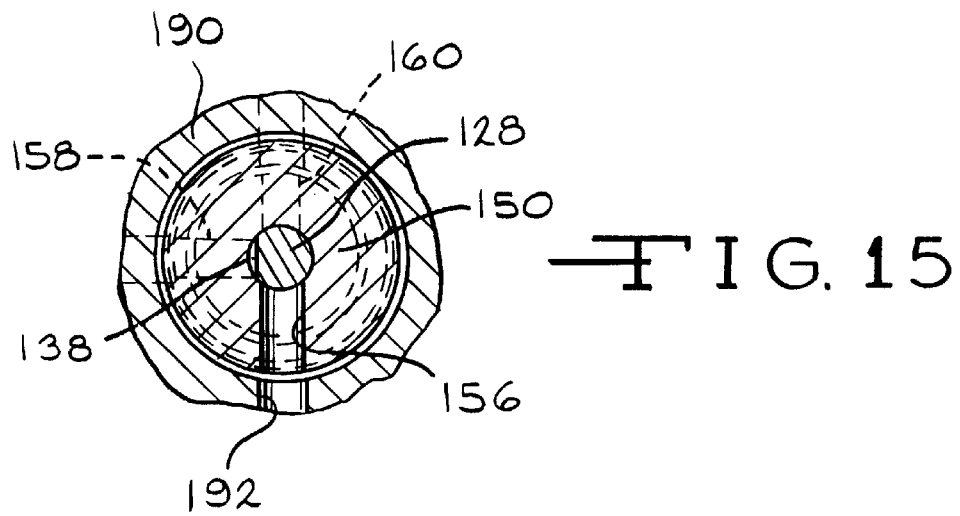
FIG. 15 is a sectional view taken along line 15—15 of FIG. 11 illustrating a supply port in the valve body and a fluid passage in the hydraulic control unit.
Figure 16:
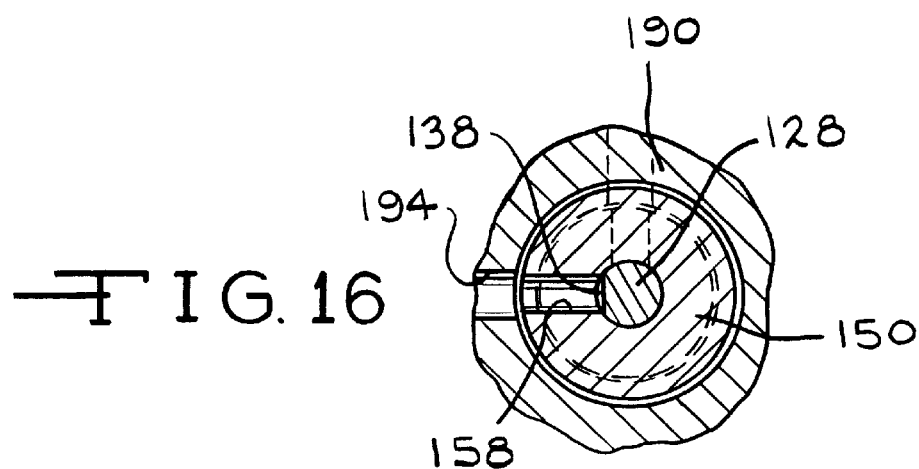
FIG. 16 is a sectional view taken along line 16—16 of FIG. 11 illustrating an output port in the valve body and a fluid passage in the hydraulic control unit.
Figure 17:
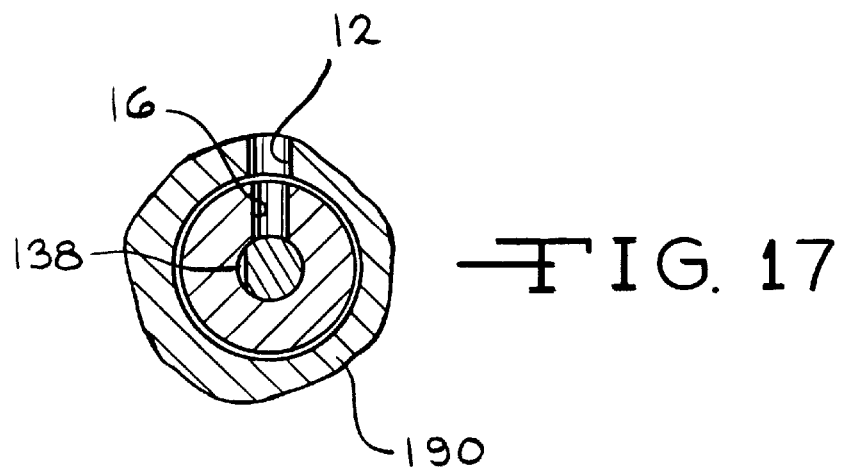
FIG. 17 is a sectional view taken along line 17—17 of FIG. 11 illustrating a reservoir port in the valve body and a fluid passage in the hydraulic control unit.

As seen in FIG. 15, a supply port 156 is formed in the cylindrical portion 150 of the valve body 118. The supply port 156 is connected to a source of pressurized brake fluid via a fluid passage 192 in the HCU 190. As seen in FIGS. 11 and 16, an output port 158 is formed in the cylindrical portion 150 of the valve body 118. The output port 158 is connected to a wheel brake via a fluid passage 194 in the HCU 190. As seen in FIG. 17, a reservoir port 160 is formed in the cylindrical portion 150 of the valve body 118. The reservoir port 160 is connected to a fluid reservoir via a fluid passage 196 in the HCU 190. Seals 198A, 198B, and 198C are received in respective groove in the outer circumference of the cylindrical portion 150 to provide fluid seals between the ports 156, 158, and 160 and the HCU 190.

The axial length of the flat 138 on the shaft 128 is selected so that the flat 138 is in communication with each of the ports 156, 158, and 160. Furthermore, the depth of the flat 138 is selected so that the rotation of the shaft 128 connects two of the selected ports. For example, when viewed in FIGS. 15–17, shaft 128 is rotated (for brake apply) so that fluid from supply port 156 can travel to output port 158 to permit pressurized fluid to reach a wheel brake. Shaft 128 is rotated (for brake dump) so that fluid from the output port 158 can travel to the reservoir port 160 to permit pressurized fluid to be dumped from a wheel brake. A hold mode at a wheel brake can be accomplished in the position illustrated in FIG. 16 wherein fluid from the output port 158 is blocked from reaching either the supply port 156 or the reservoir port 160.

An end cap 162 is provided at a lower end of the valve body 118 that covers a lower end of the shaft 128. A thrust bearing 164 is received in a cavity in a lower surface of the shaft 128 and is placed between the shaft 128 and the end cap 162. A spring 166, preferably a torsion spring, is connected to the shaft 128 and the end cap 162 and provides a resistance to the rotation of the rotor 116 in a well known manner.

Figure 18:
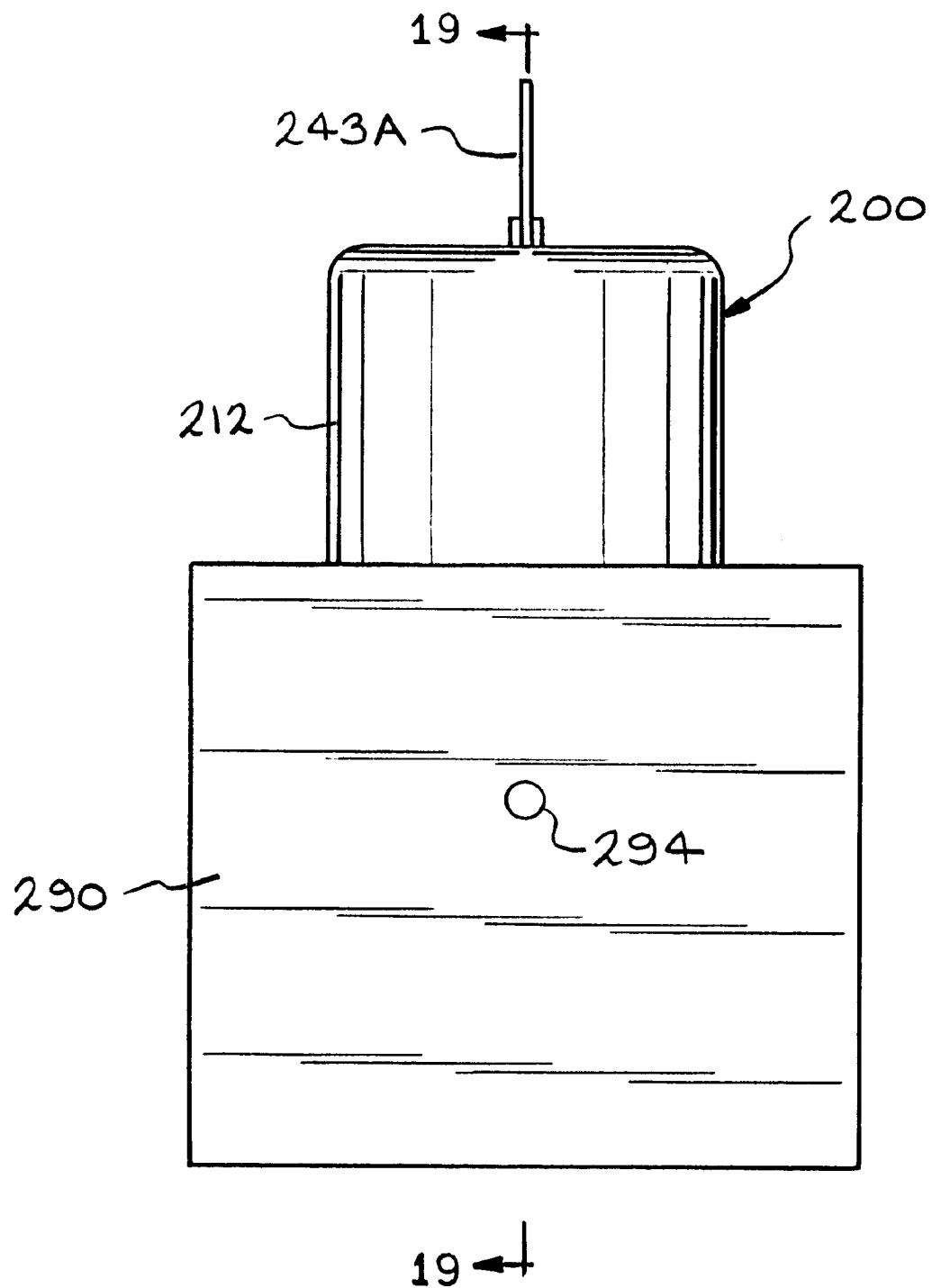
FIG. 18 is an elevational view of a third embodiment of a rotary solenoid valve according to this invention mounted on a hydraulic control unit of a vehicular anti-lock braking system.
Figure 19:
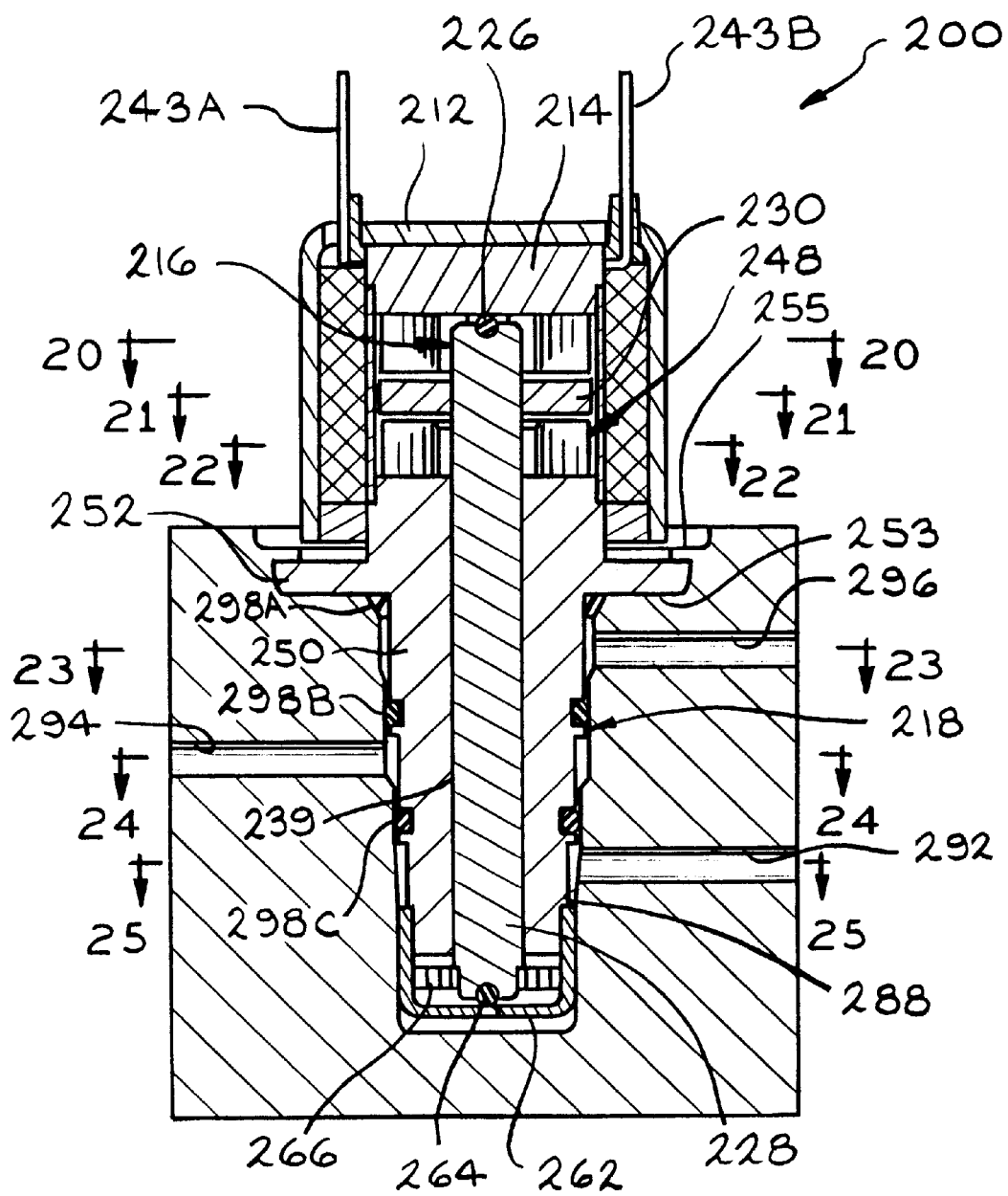
FIG. 19 is a sectional view taken along line 19—19 of FIG. 18.

A third embodiment of a rotary solenoid valve according to the present invention is indicated generally at 200 in FIGS. 18 and 19. The valve 200 is particularly suited to regulate brake fluid pressure in vehicular braking systems, such as an anti-lock braking system (ABS) or an electronic brake management system (EBM), and other automotive applications. Valve 200 is illustrated mounted in a stepped bore 288 of a hydraulic control unit (HCU) 290 of a vehicular braking system.

Figure 20:
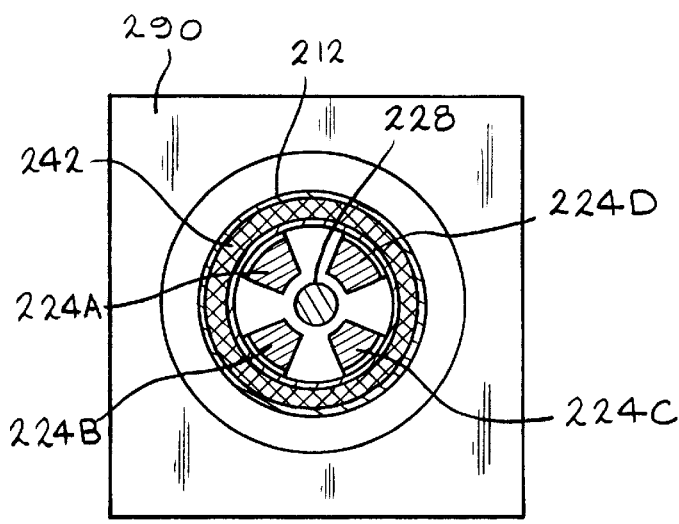
FIG. 20 is a sectional view taken along line 20—20 of FIG. 19 illustrating four legs of an upper stator.

The valve 200 includes a cup-shaped housing or casing 212 which receives an upper stator 214 and portions of a rotor 216 and a valve body 218. A lower surface of the upper stator 214 is formed in a preferred four-legged pattern producing four legs 224A–224D illustrated best in FIG. 20. Each of the legs 224A–224D extends radially inwardly toward the rotor 116. Preferably, the legs 224A–224D are equally spaced about the circumference of the upper stator 214. Preferably, a clearance is provided between a terminal end of each leg 224A–224D and the rotor 216. A thrust bearing 226, preferably formed as a ball bearing, is received in a cavity formed in an end of the rotor 216 and is in contact with the upper stator 214.

Figure 21:
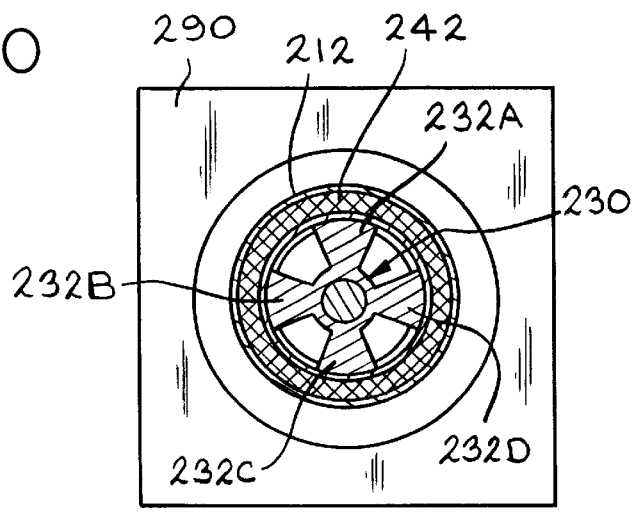
FIG. 21 is a sectional view taken along line 21—21 of FIG. 19 illustrating four legs of a wheel of a rotor.

The rotor 216 includes a shaft 228 and a wheel 230. Preferably, the wheel 230 is formed in a four-legged pattern producing four legs 232A–232D illustrated best in FIG. 21. Preferably, legs 232A–232D are equally spaced about the circumference of the wheel 230 and are aligned to be complementary to the open spaces between legs 224A–224D as seen by comparing FIGS. 20 and 21.

Figure 23:
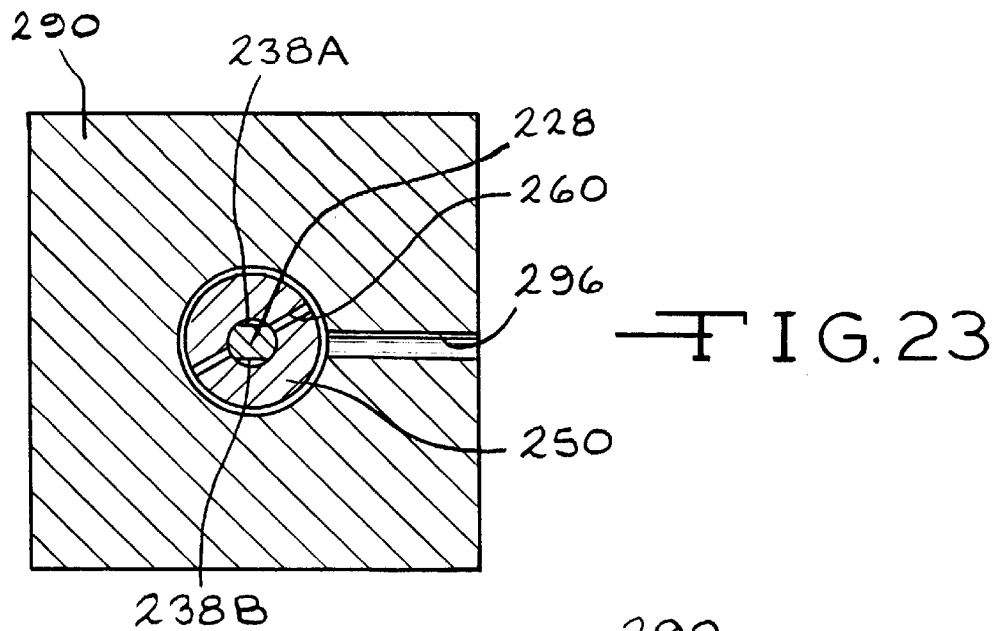
FIG. 23 is a sectional view taken along line 23—23 of FIG. 19 illustrating a reservoir port in the valve body and a fluid passage in the hydraulic control unit.
Figure 24:
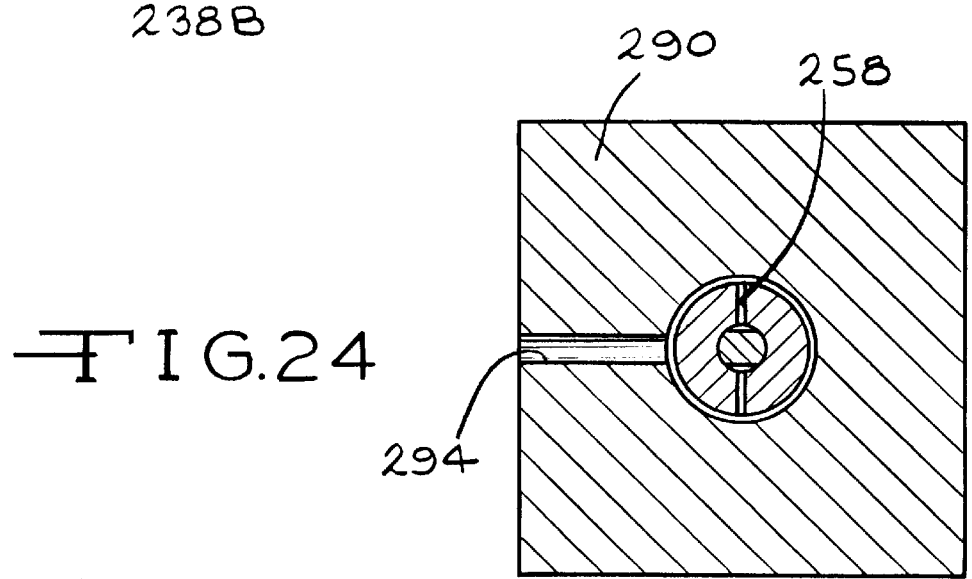
FIG. 24 is a sectional view taken along line 24—24 of FIG. 19 illustrating an output port in the valve body and a fluid passage in the hydraulic control unit.
Figure 25:
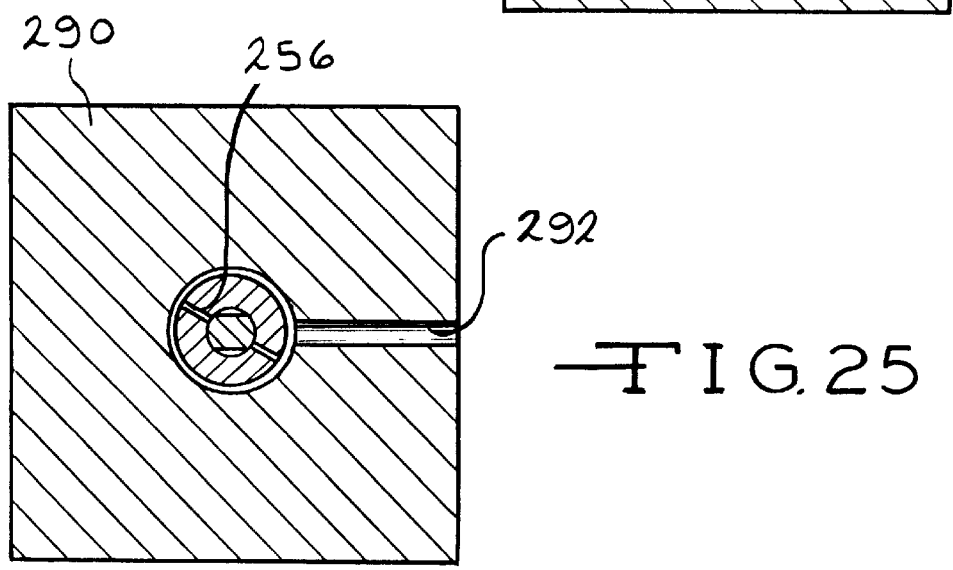
FIG. 25 is a sectional view taken along line 25—25 of FIG. 19 illustrating a supply port in the valve body and a fluid passage in the hydraulic control unit.

The shaft 228 is rotatably received in an axial bore 237 formed in the valve body 218. Axial flats 238A and 238B, illustrated in FIGS. 23–25, are formed in an outer surface of a lower portion of the shaft 228 to direct fluid flow through the valve 200 as described below. Preferably, the flats 238A and 238B are formed opposite of one another.

A coil 242 is received in the casing 212. Terminal ends 243A and 243B of the coil 242 extend through respective openings in the casing 212. An annular flux ring 245 is pressed into an open end of the housing 212 to retain the coil 242.

A lower end of a pressure tube 244 is received in an annular step 246 formed in an upper surface of the valve body 218. An upper end of the tube 244 is received in an annular step 247 formed in a lower surface of the upper stator 214. The tube 244 secures the upper stator 214 to the valve body 218, thereby containing the rotor 216 between the upper stator 214 and the valve body 218. If desired, the tube 244 can be laser welded to the upper stator 214 and/or the valve body 218.

The valve body 218 includes a lower stator portion 248 and a cylindrical portion 250. Preferably the lower stator portion 248 and the cylindrical portion 250 are formed as a unitary element as illustrated. However, in other embodiments, the lower stator portion 248 and the cylindrical portion 250 can be formed as separate elements. An annular flange 252 is formed in the upper portion of the cylindrical portion 250. The flange 252 is received on a step 253 formed in the HCU 290 as the cylindrical portion 250 is received in the bore 288. Material of the HCU 290 surrounding the step 253 is formed into an annular lip 255 to retain the valve body 218 in the HCU 290. The annular lip 255 may be formed by any suitable means including swaging.

Once valve body 218 is secured to the HCU 290, the subassembly of the casing 212, coil 242, and flux ring 245 is pressed on the valve body 218. When energized, the coil 242 creates a magnetic flux that rotates the rotor 216 in a well-known manner.

Figure 22:
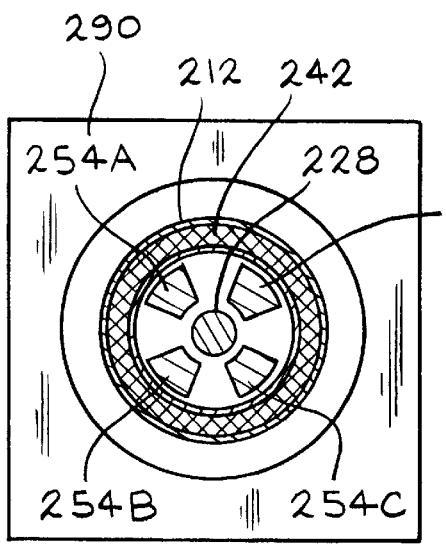
FIG. 22 is a sectional view taken along line 22—22 of FIG. 19 illustrating four legs of a lower stator of a valve body.

The lower stator portion 248 is formed in a preferred four-legged pattern producing legs 254A–254D illustrated best in FIG. 22. Preferably, legs 254A–254D are equally spaced about the circumference of the portion 248 and terminate near the shaft 228. Preferably, legs 254A–254D are substantially aligned with legs 224A–224D as seen by comparing FIGS. 20 and 22.

As shown in FIGS. 18, 19, and 23–25, the HCU 290 contains fluid passages that direct fluid from a source of pressurized brake fluid to wheel brakes after passing through various components such as valve 200 mounted in the HCU 290.

As seen in FIG. 23, a reservoir port 260 is formed in the cylindrical portion 250 of the valve body 218. The reservoir port 260 is in fluid communication with a fluid reservoir via a fluid passage 296 in the HCU 290. As seen in FIG. 24, an output port 258 is formed in the cylindrical portion 250 of the valve body 218. The output port 258 is in fluid communication with a wheel brake via a fluid passage 294 in the HCU 290. As seen in FIG. 25, a supply port 256 is formed in the cylindrical portion 250 of the valve body 218. The supply port 256 is in fluid communication with a source of pressurized fluid via a fluid passage 292 in the HCU 290. Seals 298A, 298B, and 298C (FIG. 19) are received in respective grooves in the outer circumference of the cylindrical portion 250 to provide fluid seals between the ports 256, 258, and 260 and the HCU 290.

The axial lengths of the flats 238A and 238B on the shaft 228 are selected so that the flats 238A and 238B are in fluid communication with each of the ports 256, 258, and 260. Furthermore, the depths of the flats 238A and 238B are selected so that the selected rotation of the shaft 228 connects two of the selected ports. For example, as viewed in FIGS. 23–25, when shaft 228 is rotated approximately 45 degrees clockwise, fluid from output port 258 can travel to reservoir port 260 to permit pressurized fluid to be dumped from a wheel brake. Shaft 228 is rotated approximately 135 degrees clockwise so that fluid from the supply port 256 can travel to the output port 258 to permit pressurized fluid to reach a wheel brake. A hold mode at a wheel brake can be accomplished in the position illustrated in FIGS. 23–25 wherein fluid from the output port 258 is blocked from reaching either the supply port 256 or the reservoir port 260.

An end cap 262 is provided at a lower end of the valve body 218 that covers a lower end of the shaft 228. A thrust bearing 264 is received in a cavity in a lower surface of the shaft 228 and is placed between the shaft 228 and the end cap 262. A spring 266, preferably a torsion spring, is connected to the shaft 228 and the end cap 262 and provides a resistance to the rotation of the rotor 216 in a well known manner.

Figure 26:
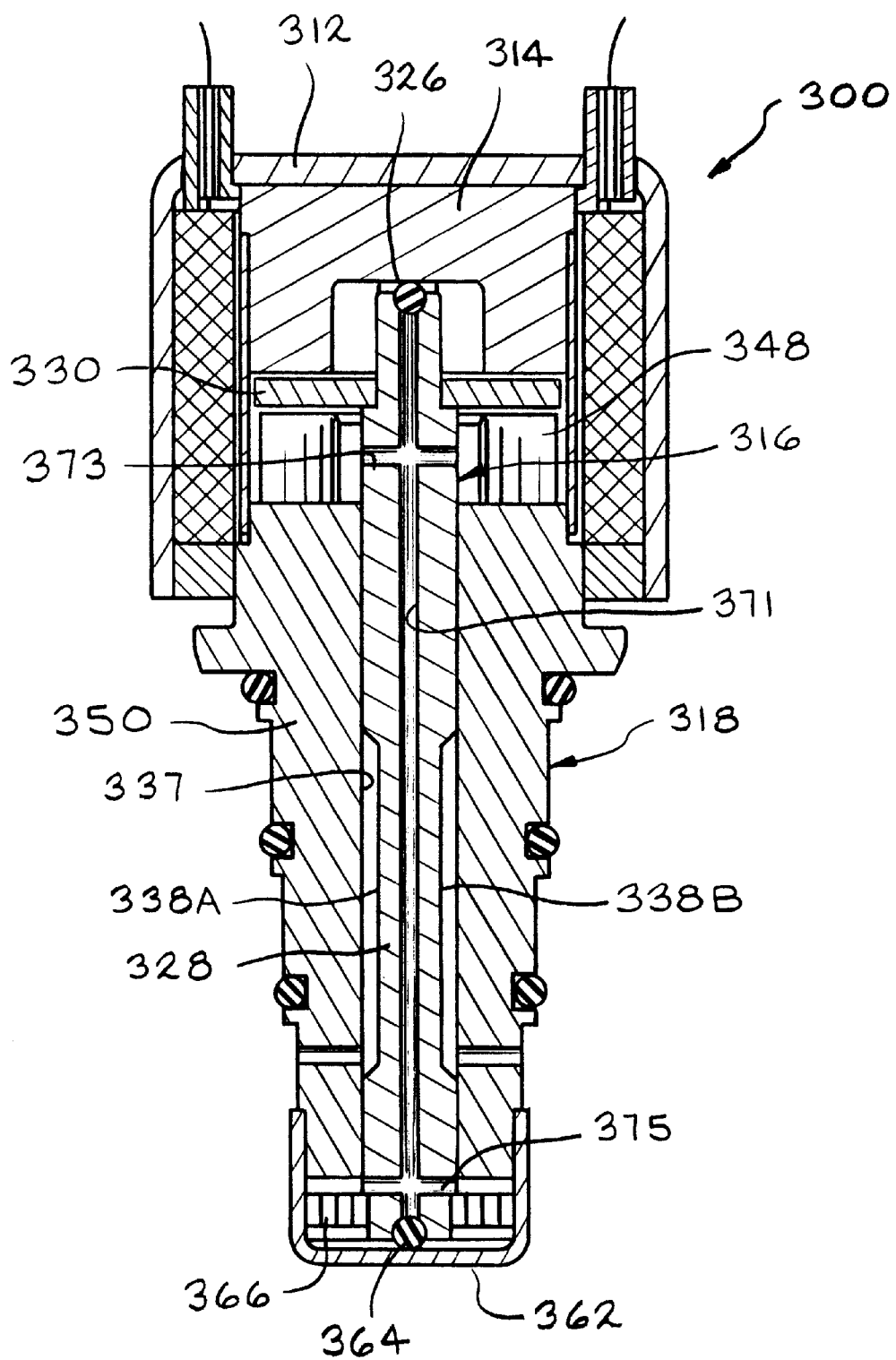
FIG. 26 is a sectional view of a fourth embodiment of a rotary solenoid valve according to this invention.

A fourth embodiment of a rotary solenoid valve according to the present invention is indicated generally at 300 in FIG. 26. The valve 300 is particularly suited to control brake fluid pressure in electronically controlled vehicular brake systems and electronically controlled vehicular suspension systems. Valve 300 is illustrated removed from a housing such as a hydraulic control unit of a vehicular brake system or a damper of a vehicular suspension system.

Valve 300 includes a casing 312 that receives an upper stator 314 and portions of a rotor 316 and a valve body 318. A lower surface of the upper stator 314 is formed with a preferred four-legged pattern. Each leg extends radially inwardly toward the rotor 316. A thrust bearing 326, preferably formed as a ball bearing, is received in a cavity formed in an end of the rotor 316 and is in contact with the upper stator 314.

The rotor 316 includes a shaft 328 and a wheel 330, also referred to as a vane armature. Preferably, the wheel 330 is formed with a four-legged pattern producing four legs or vanes.

The shaft 328 is rotatably received in an axial bore 337 formed in the valve body 318. Axial flats 338A and 338B are formed in an outer surface of a lower portion of the shaft 328 to direct fluid flow through the valve 300 in a manner similar to that described for valve 200.

The valve body 318 includes a lower stator portion 348 and a cylindrical portion 350. Preferably the lower stator portion 348 and the cylindrical portion 350 are formed as a unitary element as illustrated. The lower stator portion 348 is formed in a preferred four-legged pattern.

An end cap 362 is provided at a lower end of the valve body 318 that covers a lower end of the shaft 328. A thrust bearing 364 is received in a cavity in a lower surface of the shaft 328 and is placed between the shaft 328 and the end cap 362. A spring 366, preferably a torsion spring, is connected to the shaft 328 and the end cap 362 and provides a resistance to the rotation of the rotor 316 in a well known manner.

An axial bore 371 is formed through the shaft 328. Preferably, the terminating ends of the bore 371 intersect the cavities formed in the end surface of the bore that receives thrust bearings 326 and 364. A first cross bore 373 is formed in the shaft 328 in the region of the lower stator portion 348. A second cross bore 375 is formed in the shaft 328 between a lower surface of the valve body 318 and the spring 366. Each of cross bores 373 and 375 intersects the axial bore 371. Bores 371, 373, and 375 provide fluid communication between an interior volume of the valve 300 in a first region including the upper stator 314, the wheel 330, and the lower stator portion 348 and a second region surrounding the spring 366. Fluid can travel between the first and second regions via bores 371, 373 and 375 without communicating with fluid directed by the flats 338A and 338B of the rotating shaft 328. Thus, the rotor 316 can rotate during actuation of the valve 300 without substantial axial thrust loads, its friction, and frictional valve hysteresis.

Figure 27:
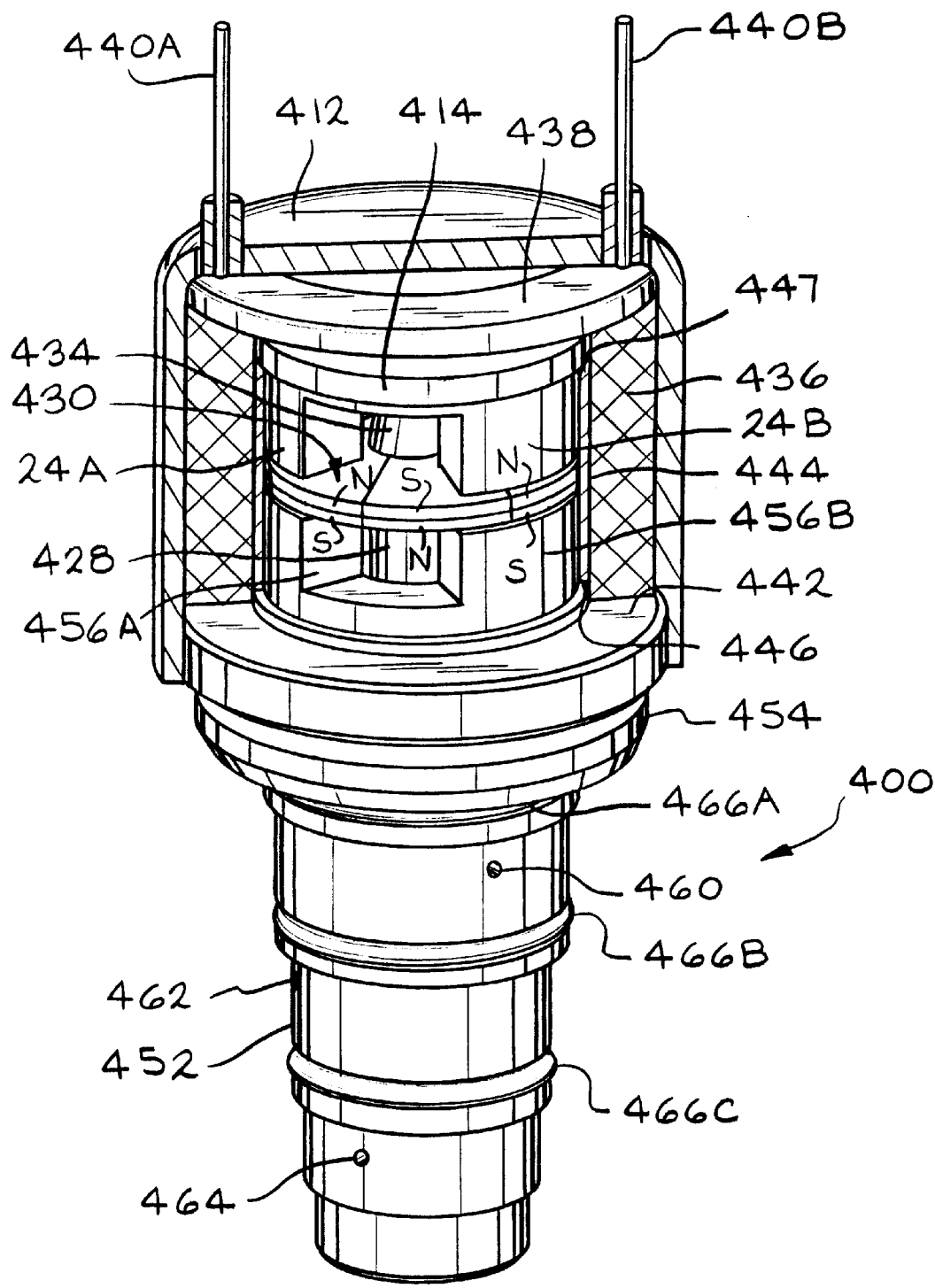
FIG. 27 is a perspective view of a fifth embodiment of a rotary solenoid valve according to this invention, wherein portions of the rotary solenoid valve are removed to illustrate a permanent magnet armature.
Figure 28:
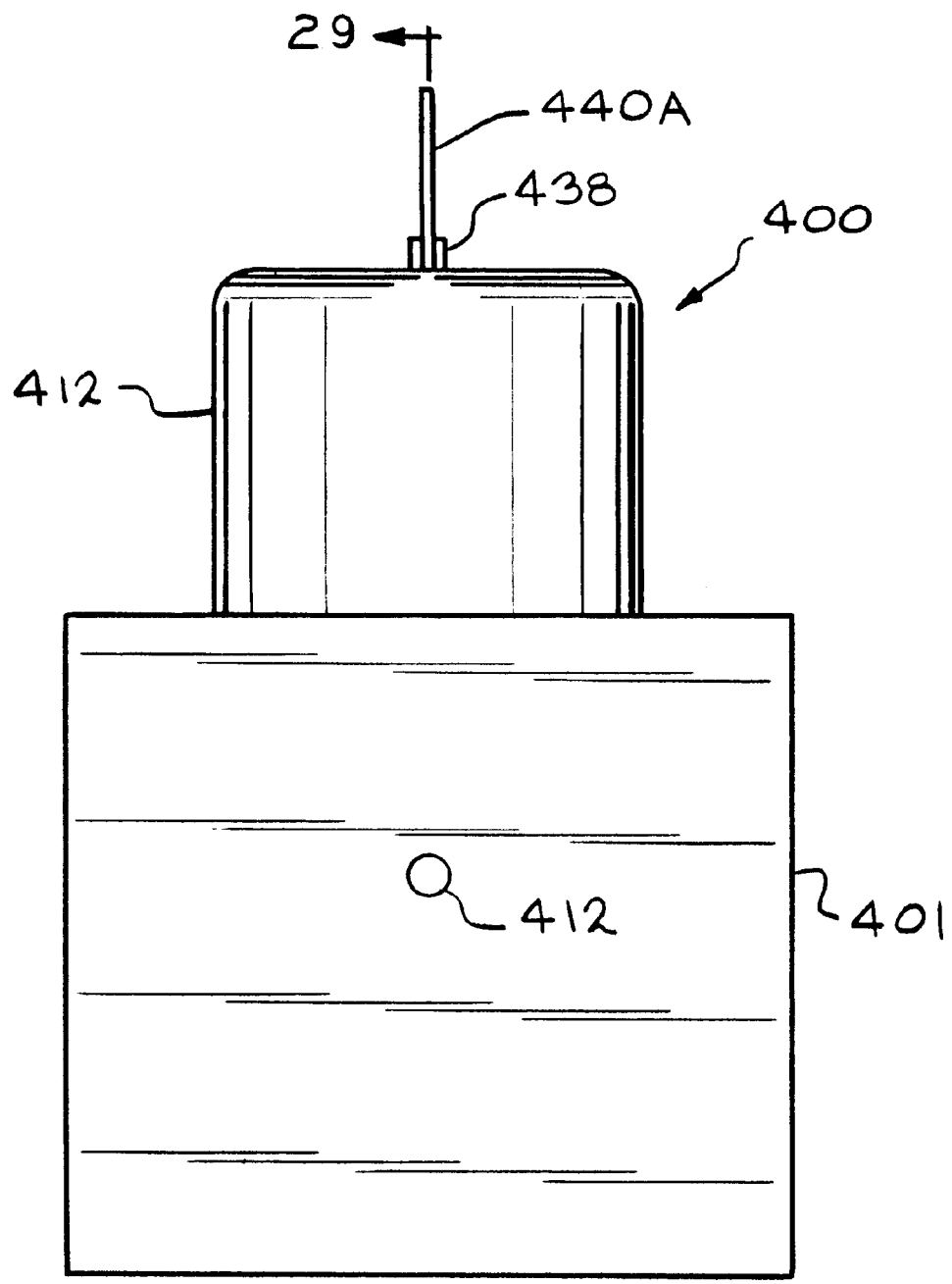
FIG. 28 is an elevational view of the rotary solenoid valve illustrated in FIG. 27 mounted on a hydraulic control unit of an electronically controlled vehicular braking system.
Figure 29:
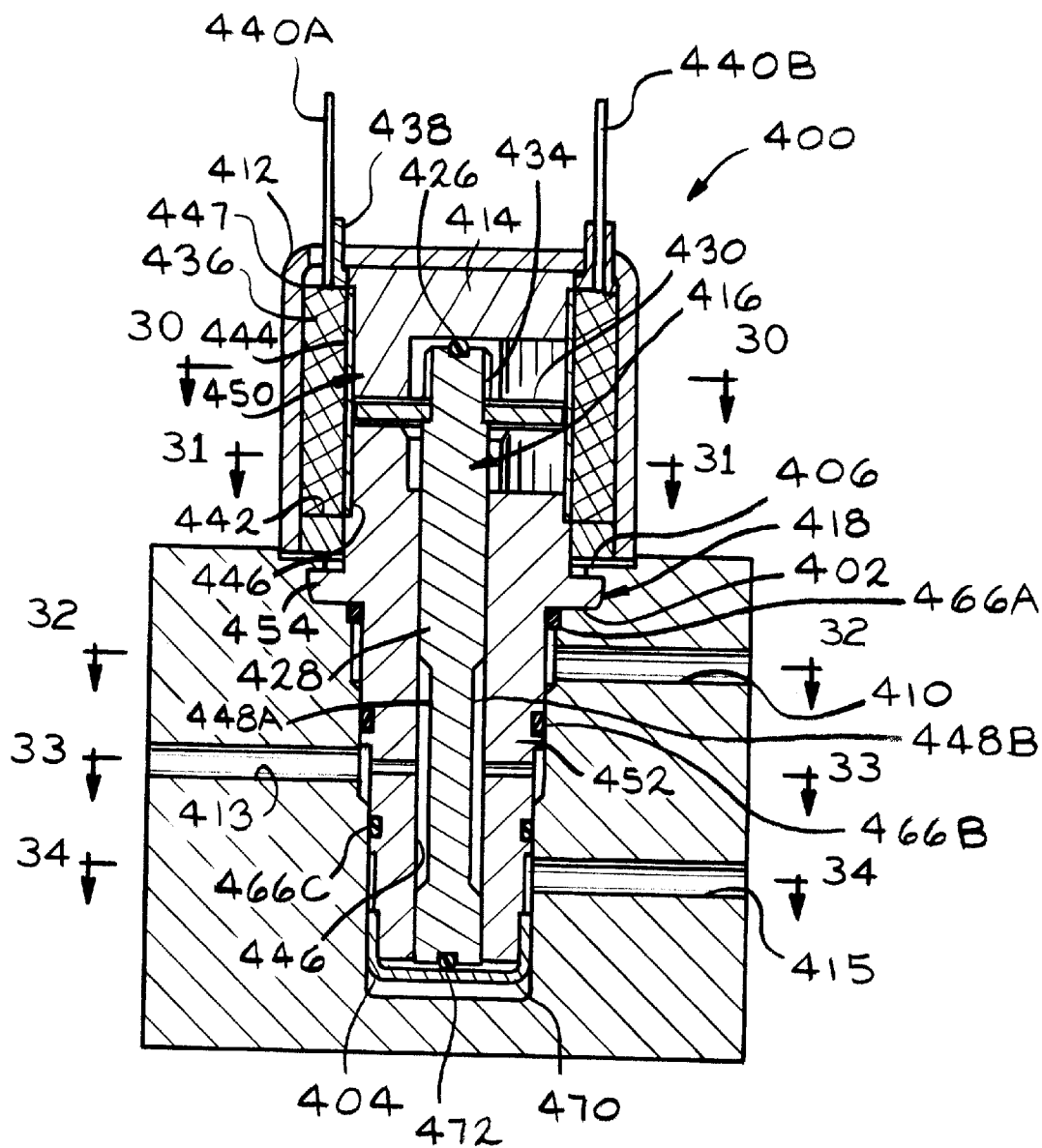
FIG. 29 is a sectional view taken along line 29—29 of FIG. 28.

A fifth embodiment of a rotary solenoid valve according to the present invention is indicated generally at 400 in FIGS. 27, 28, and 29. The valve 400 is particularly suited to control brake fluid pressure in electronically controlled vehicular brake systems and electronically controlled vehicular suspension systems. Valve 400 includes a permanent magnet armature described in detail below.

The valve 400 is illustrated mounted in a hydraulic control unit 401 of an electronically controlled vehicular braking system as described in detail below. In other embodiments, the valve 400 can be mounted in a vehicular suspension system or in other automotive applications.

Figure 30:
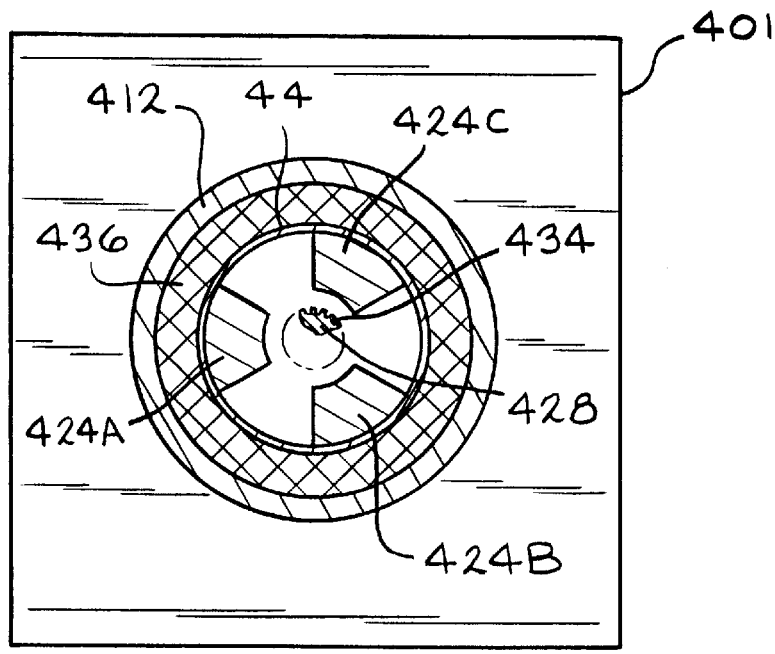
FIG. 30 is a sectional view taken along line 30—30 of FIG. 29 illustrating three legs of an upper stator.

The valve 400 includes a cup-shaped housing or casing 412 that receives an upper stator 414 and portions of a rotor 416 and a valve body 418. A lower surface of the upper stator 414 is formed in a preferred three-segment pattern producing three, raised pole segments 424A–424C illustrated best in FIG. 30. In other embodiments (not illustrated), four, five or six pole segments can be formed. Each of the pole segments 424A–424C extends radially inwardly toward the rotor 416. Preferably, the pole segments 424A–424C are equally spaced about the circumference of the upper stator 414. Preferably, a clearance is provided between a terminal end of each pole segment 424A–424C and the rotor 416. A thrust bearing 426, preferably formed as a ball bearing, is received in a cavity formed in an end of the rotor 416 and is in contact with the upper stator 414 between the pole segments 424A–424C.

The rotor 416 includes a shaft 428 and a magnetic disk 430. The disk 430 includes a central opening which receives a reduced-diameter portion of the shaft 428. A retainer 434 such as a spring collar is pressed over the reduced-diameter portion of the shaft 428 to retain the disk 430 on the shaft 428. If desired, an adhesive can be used with the retainer 434 to retain the disk 430 on the shaft 428. Preferably, the shaft 428 is formed from a non-magnetic material such as non-magnetic stainless steel or brass.

The disk 430 is a permanent magnet armature. As illustrated best in FIG. 27, the disk 430 is preferably magnetized with an upper layer of six pie-shaped, alternating polarity (north, south, north, south, etc.) pole segments. The disk 430 is preferably magnetized with a lower layer of six pie-shaped, alternating polarity (north, south, north, south, etc.) pole segments. Also, the pole segments preferably alternate polarity (north, south, north, south, etc.) between the upper layer and the lower layer as illustrated in FIG. 27. Preferably, a high-energy magnetic material such as a combination of neodymium, iron, and boron is used to form the disk 430. The disk 430 is preferably covered with a thin plastic film or other coating to protect the structural integrity of the selected material.

A coil 436 and a termination tower 438 are received in the casing 412. Terminal ends 440A and 440B of the coil 436 extend through respective openings in the casing 412. An annular flux ring 442 is pressed into an open end of the casing 412 to retain the coil 436 and termination tower 438. The coil 436 can be a bobbinless or freeform coil. The casing 412 with the coil 436 and flux ring 442 can be removed as a subassembly from the remainder of the valve 410.

A sleeve 444 connects the upper stator 414 to the valve body 418. A lower end of the sleeve 444 is received in an annular step 446 formed in an upper surface of the valve body 418. An upper end of the sleeve 444 is received in an annular step 447 formed in a lower surface of the upper stator 414. Preferably, the sleeve 444 is laser welded to the upper stator 414 and/or the valve body 418. The sleeve 444 is preferably formed from a non-magnetic material such as non-magnetic stainless steel or brass so that it is not part of the magnetic circuit of the valve 400. Thus, the thickness of the sleeve 444 does not affect magnetic performance. The sleeve 444, along with the shaft 428, sets the magnetic air gaps between the disk 430 and the coil 436. Furthermore, the sleeve 444 seals fluid in a hydraulic (lower) part of the valve 400 without the use of conventional seals which add friction and system hysteresis.

A lower portion of the shaft 428 is rotatably received in an axial bore 446 formed in the valve body 418. Longitudinal metering flats 448A and 448B, illustrated in FIGS. 29, 32, 33, and 34, are formed in an outer surface of a lower portion of the shaft 428 to direct fluid flow through the valve 400 as described below. Preferably, the flats 448A and 448B are formed opposite of one another.

The valve body 418 includes a lower stator portion 450 and a cylindrical portion 452. Preferably the lower stator portion 450 and the cylindrical portion 452 are formed as a unitary element as illustrated. However, in other embodiments, the lower stator portion 450 and the cylindrical portion 452 can be formed as separate elements. An annular flange 454 is formed in the upper portion of the cylindrical portion 452. The flange 454 is received on a step 402 formed in the HCU 401 as the cylindrical portion 452 is received in a bore 404. Material of the HCU 401 surrounding the step 402 is formed into an annular lip 406 to retain the valve body 418 in the HCU 401. The annular lip 406 may be formed by any suitable means including swaging.

Once valve body 418 is secured to the HCU 401, the subassembly of the casing 412, coil 436, and flux ring 442 can be pressed onto the subassembly of the valve body 418, upper stator 414, and sleeve 444 to serve as valve 400. Alternately, the subassembly of the casing 412, coil 436 and flux ring 442 can be dimensioned to have a controlled slip fit so that this subassembly can be attached to a control module or harness (neither is illustrated) and be removable from the lower subassembly including the valve body 418.

When energized, the coil 436 creates a magnetic flux between the upper stator 414 and lower stator portion 450 which rotates the rotor 416 formed by the permanent magnet disk 430 having its polarized pattern and the shaft 428. The rotor 416 is rotated to an angle that is proportional to the current applied to the coil 436. The direction of rotation of rotor 416 is determined by the direction of the current in the coil 436 and thus, can be reversed by reversing the current direction.

Figure 31:
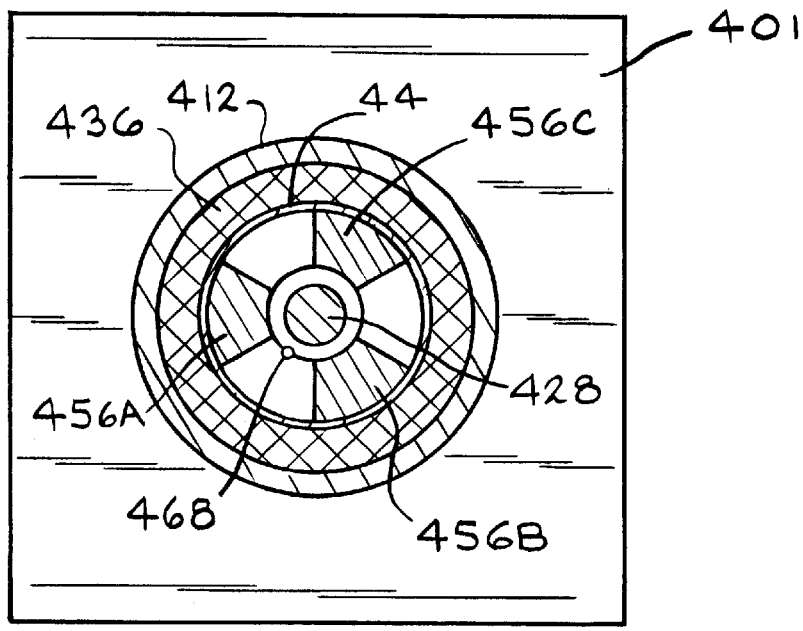
FIG. 31 is a sectional view taken along line 31—31 of FIG. 29 illustrating three legs of a lower stator.

The lower stator portion 450 is formed in a preferred three-segment pattern producing three, raised pole segments 456A–456C illustrated best in FIG. 31. Preferably, pole segments 456A–456C are equally spaced about the circumference of the portion 450 and terminate near the shaft 428. Preferably, pole segments 456A–456C are substantially aligned with pole segments 424A–424C as seen by comparing FIGS. 30 and 31.

Figure 32:
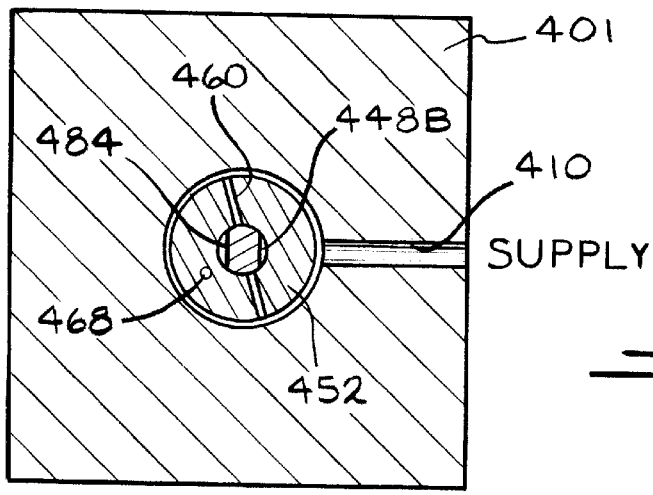
FIG. 32 is a sectional view taken along line 32—32 of FIG. 29 illustrating a supply port in the valve body and a corresponding fluid passage in the hydraulic control unit.
Figure 33:
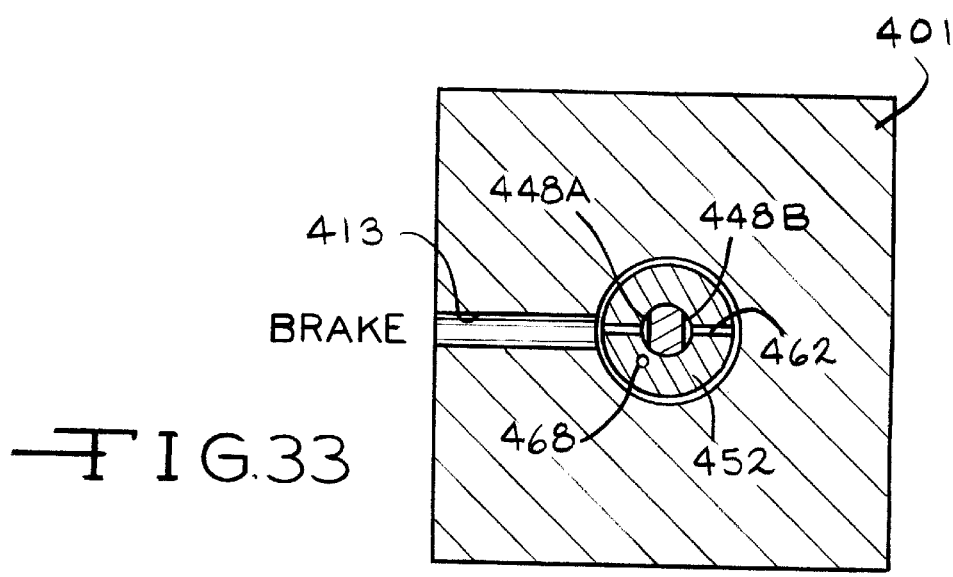
FIG. 33 is a sectional view taken along line 33—33 of FIG. 29 illustrating an output port in the valve body and a corresponding fluid passage in the hydraulic control unit.
Figure 34:
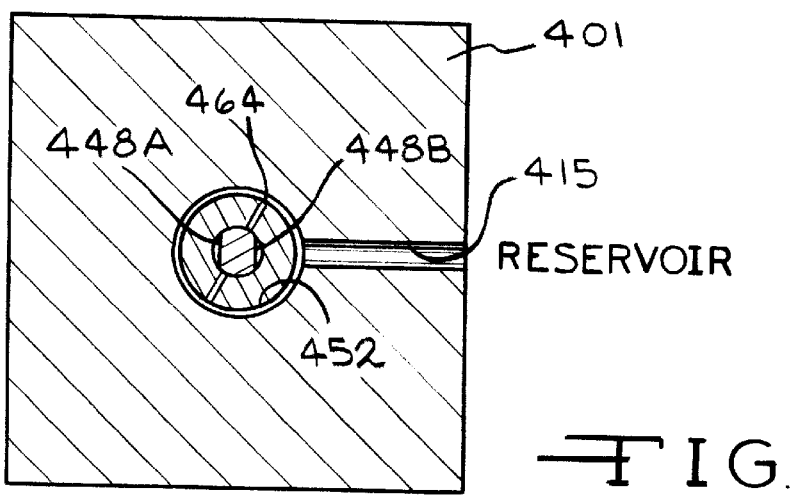
FIG. 34 is a sectional view taken along line 34—34 of FIG. 29 illustrating a reservoir port in the valve body and a corresponding fluid passage in the hydraulic control unit.

As shown in FIGS. 32, 33, and 34, the HCU 401 contains fluid passages that direct fluid from a source of pressurized brake fluid to wheel brakes after passing through various components such as valve 400 mounted in the HCU 401. Also, fluid can flow through the fluid passages from the wheel brakes to a fluid reservoir.

As seen in FIG. 32, a supply port 460 is formed in the cylindrical portion 452 of the valve body 418. The supply port 460 is in fluid communication with a source of pressurized brake fluid via a fluid passage 410 in the HCU 401. As seen in FIG. 33, an output port 462 is formed in the cylindrical portion 452 of the valve body 418. The output port 462 is in fluid communication with a wheel brake via a fluid passage 413 in the HCU 401. As seen in FIG. 34, a reservoir port 464 is formed in the cylindrical portion 452 of the valve body 418. The reservoir port 464 is in fluid communication with a fluid reservoir via a fluid passage 415 in the HCU 401. As shown in FIGS. 27 and 29, seals 466A, 466B, and 466C are received in respective grooves in the outer circumference of the cylindrical portion 452 to provide fluid seals between the ports 460, 462, and 464 and the HCU 401.

The axial lengths of the flats 448A and 448B on the shaft 428 are selected so that the flats 448A and 448B are in fluid communication with each of the ports 460, 462, and 464. Furthermore, the depths of the flats 448A and 448B are selected so that the selected rotation of the shaft 428 connects two of the selected ports. For example, as viewed in FIGS. 32–34, when shaft 428 is rotated approximately 22.5 degrees clockwise, fluid from the supply port 460 can travel to output port 462 to permit pressurized fluid to be applied from a wheel brake. Shaft 428 is rotated approximately 22.5 degrees counterclockwise from the illustrated position so that fluid from the output port 462 can travel to the reservoir port 464 to permit pressurized fluid to be dumped from a wheel brake. A balanced position is illustrated in FIGS. 32–34 wherein fluid from the output port 462 is blocked from reaching either the supply port 460 or the reservoir port 464.

The balanced position of FIGS. 32–34 is the position of the shaft 428 when the coil 436 is not energized. Once the coil 436 is energized, the disk 430 and attached shaft 428 will rotate in proportion to the current applied to the coil 436. The shaft 428 can be rotated in both the clockwise and counterclockwise directions, depending upon the polarity of the input current. The port locations in the valve body 418 and the HCU 401 can be changed so that the valve 400 provides proportionally increasing orifice size and flow between the supply port 460 and the output port 462. When the input current polarity is reversed, the valve 400 can provide proportionally increasing orifice size and flow between the output port 462 and the reservoir port 464.

A longitudinal fluid passage 468 is formed in the cylindrical portion 452 of the valve body 418. As illustrated, the passage 468 is preferably parallel to bore 446. The passage intersects the reservoir port 464 (see FIG. 34) and does not intersect the supply port 460 or the output port 462. The passage 468 extends from an upper surface of the valve body 418 as illustrated in FIG. 31 to a lower end surface of the valve body 418. This construction places the upper and lower surfaces of the shaft 28 in communication with the reservoir port 464. Such a construction balances the fluid pressure on shaft 428 to eliminate axial pressure thrust loads, its friction, and frictional valve hysteresis. Alternatively, such a passage can be formed through shaft 428 or shaft 428 can be formed as a hollow tube.

An end cap 470 is provided at a lower end of the valve body 418 that covers a lower end of the shaft 428. A thrust bearing 472 is received in a cavity in a lower surface of the shaft 428 and is placed between the shaft 428 and the end cap 470.

A preferred method for magnetizing the armature disk 430 of the rotor 416 involves inserting the rotor 416 into a fixture. The rotor 416 can be clamped at the flats 448A and 448B in the fixture. The disk 430 can be magnetized to create the desired alternating polarity patterns described above with conventional devices. Since the disk 430 is secured to the shaft 428, this process accurately positions the pole segments of the disk 430 with respect to the flats 448A and 448B. This process provides an advantage in the valve 400 in view of minimized tolerance stackup and reducing assembly costs when the rotor 416 is received in the valve body 418.

The valve 400 has been described in conjunction with its use in a hydraulic control unit of a vehicular braking system. The valve 400 can be adapted for other fluid applications including hydraulic suspension systems, machine controls, mobile power equipment controls, and other uses.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. It is also appreciated that valves 10, 100, 200, 300, and 400 have other automotive applications in addition to the incorporation into hydraulic control units of vehicular braking systems and into vehicular suspension systems.

What is claimed is:

1. A rotary solenoid valve for controlling fluid in a vehicular hydraulic system comprising:

an upper stator;

a valve body having ports and an axial bore;

a sleeve, formed from non-magnetic material, connecting the upper stator to the valve body, a rotor having a shaft and a magnetic disk, wherein the magnetic disk is positioned inside the sleeve between the upper stator and the valve body and the shaft is received in the bore of the valve body; and a coil mounted about the sleeve, wherein the sleeve and shaft set magnetic air gaps between the disk and the coil as the rotor is rotated when the coil is energized.

2. The rotary solenoid valve specified in claim 1 wherein the valve body includes:

a supply port in fluid communication with a source of pressurized fluid;

an output port in fluid communication with a passage; and a reservoir port in fluid communication with a fluid reservoir.

3. The rotary solenoid valve specified in claim 2 wherein the shaft of the rotor includes at least one flat having an axial length so that the flat is in fluid communication with the supply port, the output port, and the reservoir port.

4. The rotary solenoid valve specified in claim 3 wherein the shaft of the rotor includes a pair of opposite flats.

5. The rotary solenoid valve specified in claim 3 wherein the valve body includes a longitudinal bore and cross bores that do not intersect the flat.

6. The rotary solenoid valve specified in claim 2 wherein the valve body includes a longitudinal fluid passage intersecting the reservoir port.

7. The rotary solenoid valve specified in claim 1 wherein:

the upper stator includes a pattern of pole segments;

the disk of the rotor includes a pattern of pole segments; and the valve body includes a pattern of pole segments.

8. The rotary solenoid valve specified in claim 7 wherein the magnetic disk includes an upper layer of alternating pole segments and a lower layer of alternating pole segments.

9. The rotary solenoid valve specified in claim 8 wherein the pole segments of the magnetic disk alternate polarity between the upper layer and the lower layer.

10. The rotary solenoid valve specified in claim 1 wherein a spring is connected to the shaft of the rotor to resist rotation of the rotor when the coil is energized.

11. The rotary solenoid valve specified in claim 1 wherein the magnetic disk is formed as a permanent magnet.

12. The rotary solenoid valve specified in claim 11 wherein the permanent magnet includes alternating polarity pole segments.

13. A combined housing and rotary solenoid valve for controlling pressurized fluid in a vehicular hydraulic system comprising:

a housing having a bore;

a valve body mounted in the bore, the valve body including an axial bore in fluid communication with a supply port, an output port, and a reservoir port, wherein each of the ports in the valve body is also in fluid communication with a corresponding fluid passage formed in the housing;

a rotor including a shaft and a disk, wherein the shaft is received in the axial bore of the valve body, the shaft including at least one flat having a predetermined length so that the flat is in fluid communication with the ports in the valve body;

an upper stator mounted on the valve body by a non-magnetic sleeve; and a coil mounted about the sleeve for generating a magnetic field to selectively rotate the rotor, wherein the sleeve and shaft set magnetic air gaps between the disk and the coil and the sleeve seals fluid in a hydraulic part of the valve.

14. The combined housing and rotary solenoid valve specified in claim 13 wherein the disk is formed from a ferromagnetic material.

15. The combined housing and rotary solenoid valve specified in claim 13 including a spring connected to the rotor to resist rotating of the rotor.

16. The combined housing and rotary solenoid valve specified in claim 13 wherein the disk is a permanent magnet armature.

17. The combined housing and rotary solenoid valve specified in claim 13 wherein:

the upper stator includes a pattern of pole segments;

the rotor includes a pattern of pole segments; and the valve body includes a pattern of pole segments.

18. The combined housing and rotary solenoid valve specified in claim 13 including a pair of thrust bearing provided at each end of the shaft of the rotor.

19. The combined housing and rotary solenoid valve specified in claim 13 wherein the housing includes a hydraulic control unit of a vehicular brake system.

20. The combined housing and rotary solenoid valve specified in claim 13 wherein the housing includes a damper of a vehicular suspension system.

* * * * *